United States Patent
Kato et al.

(10) Patent No.: US 9,557,448 B2
(45) Date of Patent: Jan. 31, 2017

(54) CONTACT PREVENTION FILM, TOUCH PANEL AND DISPLAY DEVICE COVER PANEL

(75) Inventors: Tomonobu Kato, Shiga (JP); Tetsuya Minobe, Kyoto (JP); Yoshihiko Takagi, Kyoto (JP); Yuki Yamamoto, Kyoto (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 317 days.

(21) Appl. No.: 14/344,612

(22) PCT Filed: Sep. 14, 2012

(86) PCT No.: PCT/JP2012/073743
§ 371 (c)(1),
(2), (4) Date: Oct. 14, 2014

(87) PCT Pub. No.: WO2013/039238
PCT Pub. Date: Mar. 21, 2013

(65) Prior Publication Data
US 2015/0055032 A1    Feb. 26, 2015

(30) Foreign Application Priority Data
Sep. 15, 2011    (JP) .................................. 2011-202409

(51) Int. Cl.
*G02B 13/20*    (2006.01)
*G02B 5/02*    (2006.01)
(Continued)

(52) U.S. Cl.
CPC ............... *G02B 1/105* (2013.01); *G02B 1/118* (2013.01); *G02F 1/13338* (2013.01);
(Continued)

(58) Field of Classification Search
CPC .......... G02B 1/11; G02F 1/1333; G06F 3/041; G09F 9/00
See application file for complete search history.

(56) References Cited

U.S. PATENT DOCUMENTS 5,771,328 A * 6/1998 Wortman .................. F21V 5/02
349/62
8,809,811 B2 * 8/2014 Ralli ...................... G02B 5/201
250/488.1
(Continued)

FOREIGN PATENT DOCUMENTS

JP    2002-122702 A    4/2002
JP    2004-70164 A    3/2004
(Continued)

OTHER PUBLICATIONS

International Search Report for corresponding International Application No. PCT/JP2012/073743, mailed Dec. 25, 2012 (4 pages).

*Primary Examiner* — Kent Chang
*Assistant Examiner* — William Lu
(74) *Attorney, Agent, or Firm* — Osha Liang LLP

(57) ABSTRACT

Means of solution: Optical protrusions 23 of nano-size for restricting reflection of light and protection columns 24 for preventing crushing of the optical protrusions 23 are provided on a surface of a film substrate 22. The protection columns 24 have a frustum shape. When a ratio of a projection area in which all of lateral surfaces of a single protection column 24 are projected on a surface of the film substrate 22 from a direction that is perpendicular to the surface of the film substrate 22 to a divided area on the surface of the film substrate 22 with respect to the single protection column 24 is defined to be a lateral surface projection occupying area rate, the lateral surface projection (Continued)

occupying area rate of the antireflection film is not more than 0.25% and not less than 0.01%.

12 Claims, 18 Drawing Sheets

(51) Int. Cl.
G02B 27/00 (2006.01)
G02B 1/10 (2015.01)
G02F 1/1333 (2006.01)
G02F 1/1335 (2006.01)
G02B 1/118 (2015.01)
G06F 1/16 (2006.01)
G06F 3/043 (2006.01)

(52) U.S. Cl.
CPC ........ G02F 1/133502 (2013.01); G06F 1/169 (2013.01); *G02F 2001/133331* (2013.01); *G02F 2201/50* (2013.01); *G06F 3/0436* (2013.01)

(56) References Cited

U.S. PATENT DOCUMENTS

| | | | | |
|---|---|---|---|---|
| 2004/0058146 A1* | 3/2004 | Kawamura | .............. | B05D 7/00 428/323 |
| 2007/0284991 A1* | 12/2007 | Egi | ........................ | C09K 11/06 313/479 |
| 2008/0049330 A1* | 2/2008 | Tolbert | .............. | G02F 1/133606 359/599 |
| 2010/0110552 A1* | 5/2010 | Nakazawa | ............... | G02B 1/11 359/601 |
| 2010/0328776 A1* | 12/2010 | Sanari | .................... | G02B 1/118 359/601 |

FOREIGN PATENT DOCUMENTS

| | | |
|---|---|---|
| JP | 2006-331757 A | 12/2006 |
| JP | 2007-178873 A | 7/2007 |
| JP | 2010-117694 A | 5/2010 |
| WO | 2009/044578 A1 | 4/2009 |

\* cited by examiner (A)

(B)

CONTACT PREVENTION FILM, TOUCH PANEL AND DISPLAY DEVICE COVER PANEL

TECHNICAL FIELD

The present invention relates to a contact prevention film, a touch panel and a display device cover panel. More particularly, the present invention relates to a contact prevention film that hardly coheres to an opposing member when pressed with a finger or the like. It also relates to a touch panel and a display device cover panel comprising the present coherence prevention film as an application thereof.

BACKGROUND ART

Actions of an Antireflection Film

Various kinds of equipment such as mobiles phones, mobile computers and personal computers comprise display devices that are capable of displaying definite images. However, inconveniences are caused in display devices in that upon incidence of outside light such as sunlight or indoor illumination light on the screen, reflection of a part of the light on screens causes degradations of contrasts of images such that the screens become whitish.

Such a phenomenon of reflection of outside light is caused as shown, for instance, in FIG. 1(A). FIG. 1(A) shows a display device 11 with a cover panel 13 overlapped onto a front surface of a liquid crystal display panel 12 with an air gap (space) being interposed between. Upon incidence of outside light onto this display device 11, 4% of a quantity of light of the incident outside light is reflected at a front surface of the cover panel 13, 3.8% of the quantity of light of the incident outside light is reflected at a rear surface of the cover panel 13, and 3.7% of the quantity of light of the incident outside light is reflected at the front surface of the liquid crystal display panel 12. As a result, upon incidence of outside light having a quantity of light of 100% to this display device 11, a total of 11.5% of the quantity of light of the incident outside light is reflected towards a front surface side. Accordingly, the reflected light (white light) is overlapped onto the image being displayed on the liquid crystal display panel 12 so as to degrade the contrast of the image and to accordingly degrade the display quality.

An antireflection film (ARS) is employed for preventing such a phenomenon. An example of an antireflection film is disclosed, for instance, in Patent Literature 1. This antireflection film is formed by congesting minute optical protrusions on a surface of a transparent film substrate wherein the protrusions have a refractive index that is identical to that of the film substrate. The optical protrusions might have shapes such as a conical shape, of truncated cone shape or quadrangular pyramid shape.

FIG. 1(B) shows a case in which the antireflection film 14 is affixed to the rear surface of the cover panel 13. In this case, 4% of the quantity of light of the incident outside light is reflected at the front surface of the cover panel 13, 0.34% of the quantity of light of the incident outside light is reflected at the rear surface of the cover panel 13, and 3.83% of the quantity of light of the incident outside light is reflected at the front surface of the liquid crystal display panel 12. As a result, reflection at the rear surface of the cover panel 13 affixed with the antireflection film 14 is largely restricted, and only a total of 8.17% of the quantity of light of the incident outside light is reflected towards the front surface side. Accordingly, by affixing a single antireflection film 14, the quantity of reflected light will become approximately ⅔ of a case in which no antireflection film 14 is affixed.

FIG. 1(C) shows a case in which antireflection films 14 are affixed to the rear surface of the cover panel 13 and the front surface of the liquid crystal display panel 12, respectively. In this case, 4% of the quantity of light of the incident outside light is reflected at the front surface of the cover panel 13, 0.34% of the quantity of light of the incident outside light is reflected at the rear surface of the cover panel 13, and 0.33% of the quantity of light of the incident outside light is reflected at the front surface of the liquid crystal display panel 12. As a result, reflection at the rear surface of the cover panel 13 and the front surface of the liquid crystal display panel 12 affixed with the antireflection film 14 is restricted, and only a total of 4.67% of the quantity of light of the incident outside light is reflected towards a front surface side. Accordingly, by affixing two antireflection films 14, the quantity of reflected light will become approximately ⅓ of a case in which no antireflection film 14 is affixed.

Accordingly, by affixing an antireflection film to the display device, it is possible to reduce reflection of outside light and to improve the contrast of images so that images are clearly displayed. It should be noted that while a reflectance of a surface that is not affixed with the antireflection film is 4% while a reflectance of a surface that is affixed with the antireflection film is 0.35%, these are typical values that have been employed here, and the values of reflectance might somewhat change depending on types of the antireflection film or materials of the cover panel.

(Weak Points of the Antireflection Film)

Stains and sebum easily attach to display devices employed in mobile phones or mobile computers or the like. Accordingly, the surface of the display device is repeatedly rubbed with a soft cloth or a cleaner for wiping the stains or sebum off. Since the cover panel is pressed with a finger at the time of wiping the stains and sebum off the surface, when an antireflection film is affixed as in FIG. 1(B) or FIG. 1(C), the minute optical protrusions of the antireflection film are pressed against opposing surface and become easily crushed. Further, in a display device comprising a touch panel on the surface thereof, the touch panel is pressed by a finger or a touch pen so that when antireflection film is affixed, it is also the case that the optical protrusions of the antireflection film are pressed against the opposing surface and become easily crushed. Such crushing of the optical protrusions might result in degradations or damages of antireflection functions of the antireflection film.

(Protection Columns of the Antireflection Film)

In view of this point, in the antireflection film as disclosed in Patent Literature 2, the antireflection film is formed by congesting optical protrusions of nano-order on a surface thereof while dispersing protection columns of micron-order that have a larger height than the optical protrusions. The optical protrusions are protected by the protection columns so that the optical protrusions are hardly crushed even when the surface of the display device is pressed.

Patent Literature 2 recites protection columns of pyramid shape such as a conical, quadrangular pyramid or triangular pyramid shape and protection columns of column shape such as a quadrangular prism, columnar or elliptic cylindrical shape. However, in case of protection columns of pyramid shape, tip ends are apt to be crushed when the protection columns are pressed against an opposing surface. Further, in case of protection columns of column shape having a uniform section, the mold releasability at the time of forming the antireflection film will be bad so that the protection columns will hardly part from forming dies, and it will be difficult to obtain protection columns of large height. Therefore, while there are generally employed protection columns of truncated cone shape, an inclination angle of lateral surfaces thereof is defined to be 70 degrees. FIG. 2 is a SEM photograph of a general protection column of truncated cone shape seen from a diagonal direction.

However, when the protection columns of the antireflection film are formed to have a truncated cone shape as shown in FIG. 2 (with an inclination angle of the lateral surfaces of approximately 70 degrees), antireflection effects and haze values are worsened when outside light is made incident onto an opposite surface (rear surface) of a surface provided with optical protrusions 16 and protection columns 15 (hereinafter referred to as "rear surface incidence) as shown in FIG. 3(C) when compared to a case in which the outside light is made incident onto a surface (front surface) provided with the optical protrusions 16 and the protection columns 15 (hereinafter referred to as "front surface incidence") as shown in FIG. 3(A). FIG. 3(B) is a photomicrograph of an antireflection film surface in case of front surface incidence of outside light and FIG. 3(D) is a photomicrograph of an antireflection film surface in case of rear surface incidence of outside light. As it can be understood from these photomicrographs, spots of the respective protection columns are shining quite brightly in case of rear surface incidence when compared to the case of front surface incidence. Further, in case of rear surface incidence, boundaries of an area including the shining protection columns 15 are vague and considerably spread. Expressing this in numerical values, the reflectance of the antireflection film in case of rear surface incidence will become larger by 0.49% when compared to a case of front surface incidence, and the haze value is also larger by 0.6%.

The reason thereof is as follows. When light L1 enters a truncated cone shaped protection column 15 as shown on the right part as one faces in FIG. 4(A) through rear surface incidence, the incident light L1 is totally reflected several times by the lateral surfaces of the protection column 15 and is regressively reflected. As a result, the reflectance of the antireflection film 14 will be higher in case of rear surface incidence. Further, light L2 that enters the protection column 15 from the liquid crystal display panel 12 side is refracted at the protection column 15 and is thus dispersed so that the haze value becomes also high.

Further, in case light enters the antireflection film provided with protection columns 15 as shown in FIG. 2 through rear surface incidence, when the cover panel 13 is pressed with a finger, a portion of the crushed protection column 15 will look like a black dot to become a defect on the screen (hereinafter, such a black dot might also be referred to as a black stain).

The reason thereof is as follows. As shown on the left part as one faces in FIG. 4(A), when the cover panel 13 is pressed with a finger so that the protection column 15 is pressed against the liquid crystal display panel 12, an outer peripheral surface of the protection column 15 is expanded such that the shape of the protection column 1 approximates a columnar shape. Accordingly, light L3 made incident into the protection column 15 tends to transmit through the protection column 15. A protection column 15 that is not pressed against the liquid crystal display panel 12 will regressively reflect the rear surface incident light so that most of the area of the antireflection film that is not pressed with a finger will shine brightly. In contrast thereto, in case of a protection column 15 that is pressed against the liquid crystal display panel 12, rear surface incident light will transmit and not be reflected by the protection column 15, the pressed protection column 15 will become darker than its surrounding region that looks shiny through regressive reflected light and will look like a black stain. As shown in the photo of FIG. 4(B), particularly when the cover panel 13 is pressed with two fingers, protection columns 15 located on a line segment connecting two pressed points will be crushed so that the black stains will be connected in a linear shape so that they look like a black line.

In this manner, optical properties of a conventional antireflection film provided with protection columns as shown in FIG. 2 differ largely between cases of rear surface incidence and cases of front surface incidence. Accordingly, optical properties such as reflectance and haze value differ largely between cases in which the antireflection film is affixed to the front surface of the liquid crystal panel (in cases of front surface incidence) and in which it is affixed to the rear surface of the cover panel (in cases of rear surface incidence) which was inconvenient in view of design or use of the display devices which made it hard to use those films.

PRIOR ART REFERENCES

Patent Literature

Patent Literature 1: Japanese Patent Laid-Open Publication No. 2002-122702
Patent Literature 2: Japanese Patent Laid-Open Publication No. 2004-70164

SUMMARY OF THE INVENTION

Subject the Invention is to Solve

The present invention has been made in view of the above technical subject, and it is an object thereof to make differences in optical properties small in cases of rear surface incidence and in cases of front surface incidence in a contact prevention film comprising projections (optical film comprising contact prevention functions). It is also an object thereof to restrict phenomena in which spots of projections turn into black stains when the contact prevention film is pressed (that is, when the contact prevention film is pressed against an opposing member or the opposing member is pressed against the contact prevention film).

Means for Solving the Subject

The coherence prevention film according to the present invention is a coherence prevention film comprising a film substrate and a plurality of projections formed on a surface of the film substrate, wherein the projections are arranged in that their sectional areas of sections that are parallel to a surface of the film substrate become gradually smaller in approaching from an base end portion side towards a tip end portion side, and wherein a lateral surface projection occupying area rate, which is a ratio of a projection area in which all of the lateral surfaces of a single projection are projected on a surface of the film substrate from a direction that is perpendicular to the surface of the film substrate to a divided area on the surface of the film substrate with respect to the single projection, is not more than 0.25%.

Since the coherence prevention film of the present invention is arranged in that the lateral surface projection occupying area rate of the projection is not more than 0.25%, light will be reflected by the projections and hardly returns when light enters the coherence prevention film through rear surface incidence so that the difference in reflectance between cases in which the light enters through rear surface incidence onto the coherence prevention film and in which it enters through front surface incidence becomes small. It is also possible to make the haze value of the projection small. Moreover, even when the projection is pressed by an opposing member (such as an image display panel), it is possible to prevent generation of a black stain caused by a black looking projection. Still further, since the projections are arranged in that their sectional areas of sections that are parallel to the surface of the film substrate become gradually smaller in approaching from an base end portion side towards a tip end portion side (for instance, frustum shaped projections), the projections easily come off from the forming dies at the time of forming the coherence prevention film. Particularly when the lateral surface projection occupying area rate of the projections is defined to be not more than 0.01%, the projections come easily off from the forming dies.

In this respect, for obtaining the lateral surface projection occupying area rate, calculation should be made not for the entire coherence prevention film but calculation should be made for a partial region including several projections. It would be sufficient when the lateral surface projection occupying area rate is not more than 0.25% at a principal region or a majority of regions of the coherence prevention film. This is because no problems will be substantially caused even when the lateral surface projection occupying area rate is larger than 0.25% at discreet portions such as peripheries of the coherence prevention film or at invisible portions that are covered by a cover or the like.

In an embodiment of the coherence prevention film according to the present invention, it is desirable to set an inclination angle of at least abase end portion of the lateral surfaces of the projection to be not less than 80 degrees and below 90 degrees. By defining the inclination angle of at least the base portion of the lateral surfaces of the projection to be in this range, it is possible to more reliably improve optical properties of the coherence prevention film. More particularly, it is possible to make the difference in reflectance small in cases of rear surface incidence and front surface incidence, to make the haze value small and to prevent black stains from forming at spots of projections when they are pressed.

In another embodiment of the coherence prevention film according to the present invention, it is desirable that the inclination angle of at least the base end portion of the lateral surfaces is not more than 88 degrees. According to such an embodiment, the projections come more easily and reliably off from forming dies.

In still another embodiment of the coherence prevention film according to the present invention, a column density, which is a ratio of a base area of a single projection to a divided area on the surface of the film substrate with respect to the single projection, is not more than 2.5%. This is because the reflectance of the coherence prevention film becomes larger than a practical value when the column density becomes large than 2.5%. Also, when the column density becomes larger than 2.5%, the black stains will look in a linearly connected manner when a rear surface of the coherence protection film is pressed so that the screen cannot be seen too well when employed in a display device.

In still another embodiment of the coherence prevention film according to the present invention, an antireflection structure comprised of a plurality of minute optical protrusions is formed on the surface of the film substrate. Such an embodiment applies when the coherence prevention film is configured as an antireflection film. In such a coherence prevention film, it is possible to achieve protection through the projections so that the optical protrusions will not be crushed.

In this respect, though it is aimed to manufacture projections with definite boundaries between lateral surfaces and tip end surfaces, for instance, projections in which boundaries between the lateral surfaces and tip end surfaces form angles, the boundaries between the lateral surfaces and tip end surfaces will be rounded due to manufacturing reasons so that boundaries of the lateral surfaces become unclear. However, such projections are also included in the scope of the present invention.

Also in case the coherence prevention film of the present invention is affixed to a touch panel (particularly to a rear surface of a touch panel), optical properties such as reflectance and haze value are hardly reduced. Further, black stains are hardly generated at spots of the projections when the touch panel is pressed with a finger or a touch pen. Accordingly, it is possible to improve qualities of the touch panel when the touch panel is affixed with the coherence prevention film of the present invention.

Similarly, when the coherence prevention film of the present invention is affixed to a display device cover panel (particularly a rear surface of the display device cover panel), it is possible to improve qualities of the display device cover panel.

In this respect, the above means for solving the subject according to the present invention includes features that are achieved by suitably combining the above explained components, and the present invention enables many variations by combining such components.

BRIEF EXPLANATION OF THE DRAWINGS

FIG. 7 FIG. 7(A) to FIG. 7(C) are perspective views showing other shapes of the protection column.

EXPLANATION OF THE REFERENCE SIGNS

Figure 1:
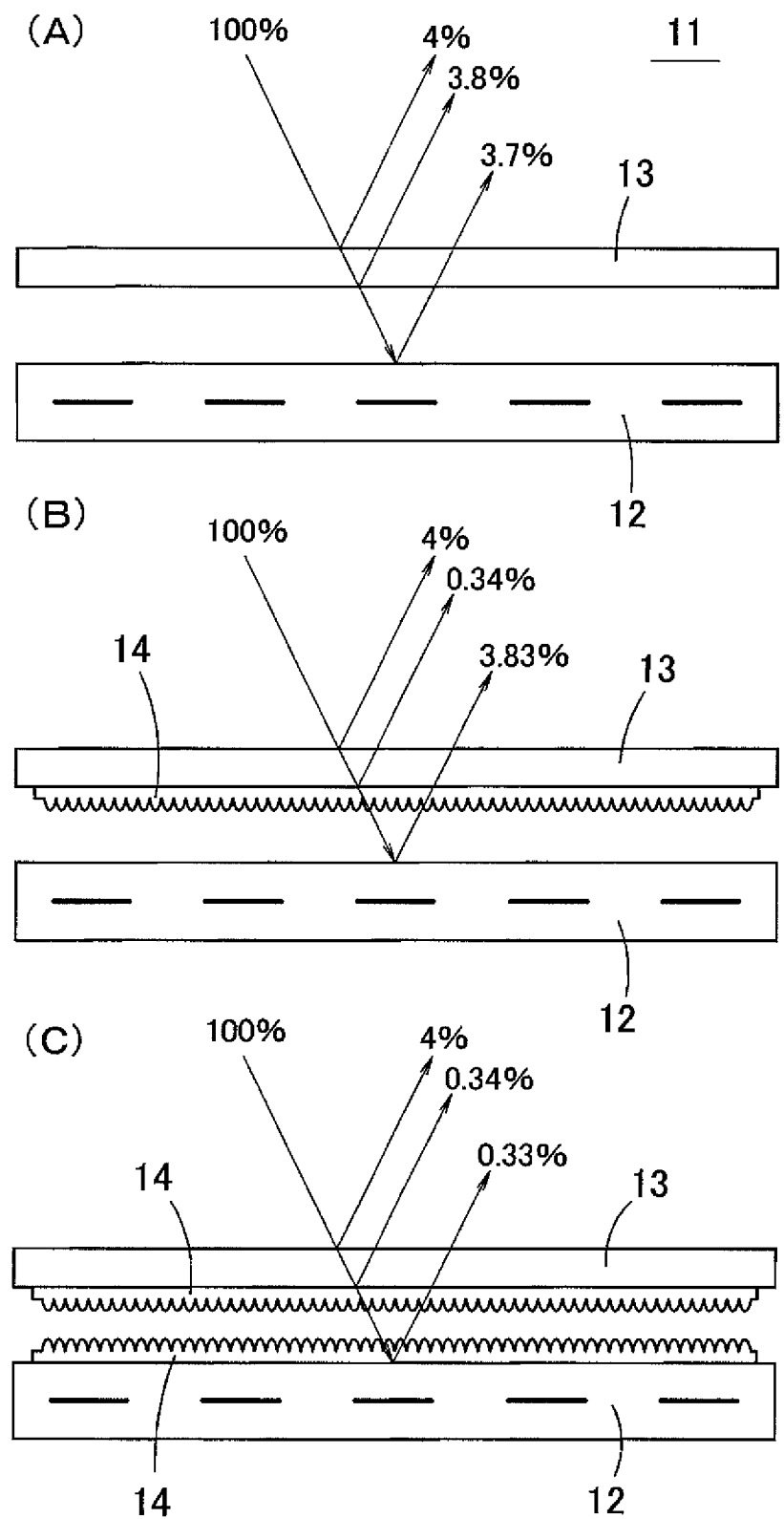
FIG. 1(A) is a schematic sectional view of a display device that is not provided with an antireflection film.
FIG. 1(B) is a schematic sectional view of a display device using a single antireflection film.
FIG. 1(C) is a schematic sectional view of a display device using two antireflection films.

21 Antireflection film
22 Film substrate
23 Optical protrusion
24 Protection column
24a Lateral surface
24b Tip end surface
31, 34, 36, 41, 61 Display device
32 Image display panel
33 Cover panel
35 Antireflection film
42 Touch panel

MODE FOR CARRYING OUT THE INVENTION

Suitable embodiments of the present invention will now be explained while referring to the accompanying drawings. It should, however, be noted that the present invention is not limited to the following embodiments but various changes of design can be made without departing from the gist of the present invention.

The following embodiments will be explained while taking an example of a coherence prevention film comprising optical protrusions for restricting reflection of incident light, that is, an antireflection film, but the present invention could also be a coherence prevention film that does not include optical protrusions for preventing reflection.

(Structure of the Antireflection Film)

Figure 5:
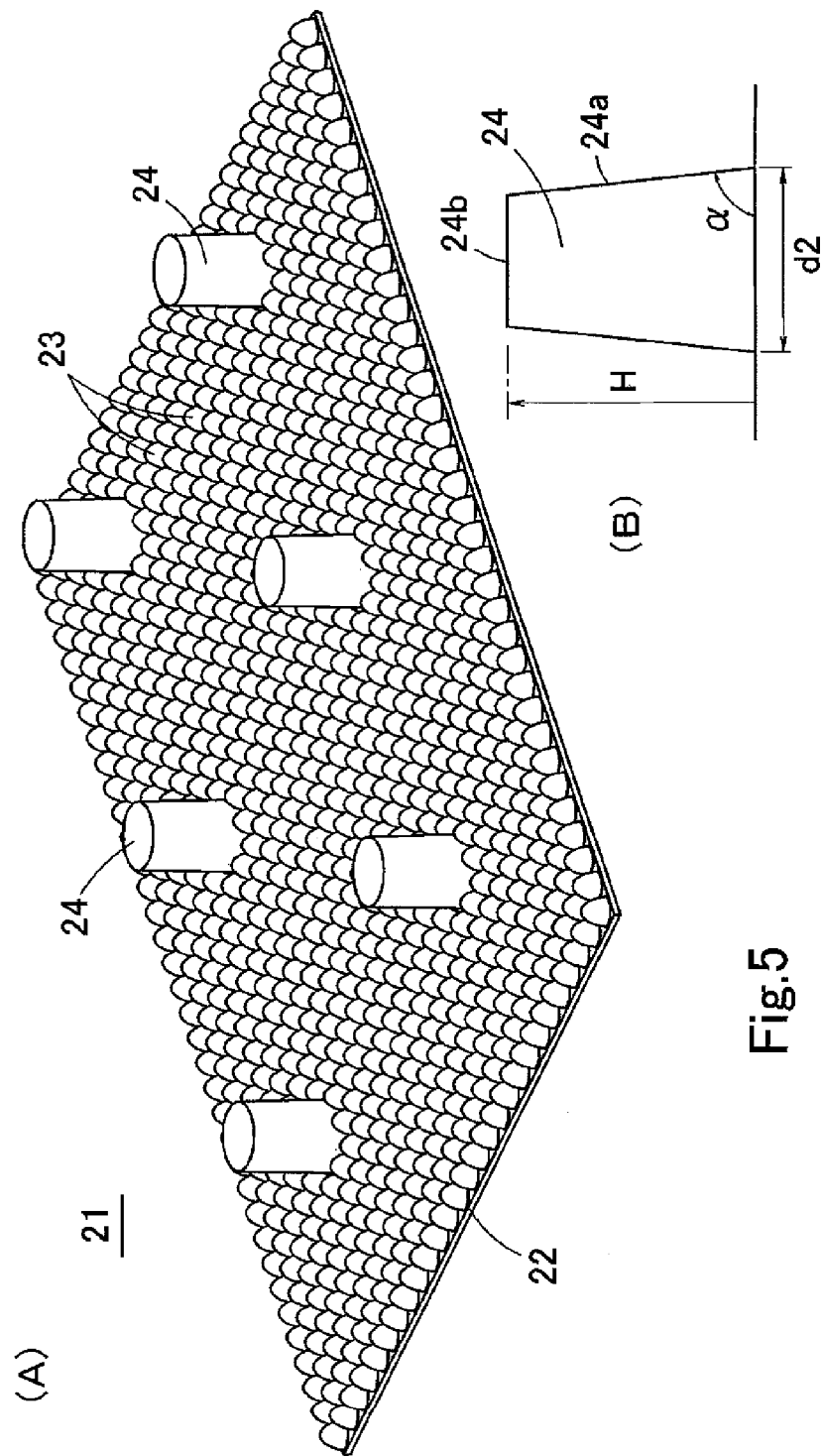
FIG. 5(A) is a perspective view showing a part of the antireflection film according to the present invention in enlarged view.
FIG. 5(B) is a schematic enlarged sectional view of a protection column provided on the antireflection film.

FIG. 5(A) is a perspective view showing a part of an antireflection film 21 according to the present invention in enlarged view. FIG. 5(B) is a sectional view showing a section passing through a center of its projection, that is, a protection column 24. The antireflection film 21 is obtained by congesting, on a flat surface of a transparent film substrate 22, a plurality of transparent optical protrusions 23 having a refractive index identical to that of the film substrate 22. Further, transparent protection columns 24 (projections for preventing coherence) of truncated cone shape and having a refractive index identical or substantially identical to that of the film substrate 22 are arranged on the surface of the film substrate 22 at constant pitch.

The film substrate 22 is formed to be of plate-like shape using transparent resin having a high refractive index such as polycarbonate resin or acrylic resin. The film substrate 22 could be either a hard-type resin substrate or a soft film substrate of small thickness, wherein the thickness does not particularly matter here.

The optical protrusions 23 are minute protrusions of nano-size and are formed to have a conical shape, a truncated cone shape or a quadrangular pyramid shape. The shape of the optical protrusions 23 could be a part of a spheroid.

The protection columns 24 are of truncated cone shape having a smaller tip end surface area than a bottom surface area, and the columns are arranged at a constant pitch. For instance, the protection columns 24 have a bottom surface diameter d2 of 5 μm, a height H of 2 μm, and an inclination angle α of the lateral surfaces 24a (outer peripheral surface) of not less than 80 degrees and below 90 degrees (preferably not more than 88 degrees), and an array pitch thereof is 50 μm.

Figure 6:
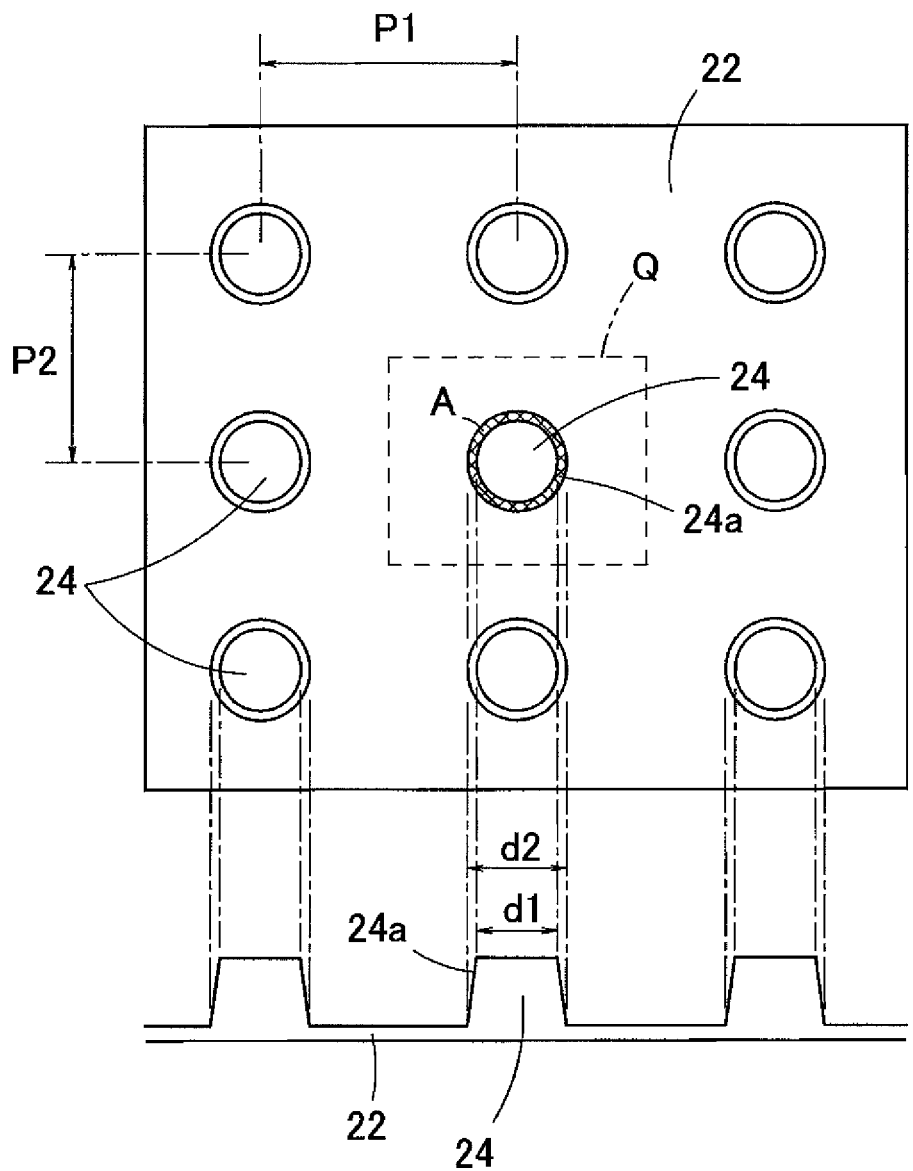
FIG. 6 is a view for explaining a lateral surface projection occupying area rate of the antireflection film.

The protection columns 24 are designed such that a lateral surface projection occupying area rate thereof is not less than 0.01% and not more than 0.25%. The lateral surface projection occupying area rate is a ratio of a projection area in which all of the lateral surfaces 24a of a protection column 24 are projected on a surface of the film substrate 22 (or bottom surface of the protection column) from a direction that is perpendicular to the surface of the film substrate 22 (or bottom surface of the protection column) to a divided area on the surface of the film substrate 22 with respect to the single protection column 24 expressed in percentage. FIG. 6 is a view for concretely explaining the lateral surface projection occupying area rate and shows a plan view of the antireflection film 21 and a section that passes a center of the protection column 24 (optical protrusions 23 are omitted). Here, the projection area in which all of the lateral surfaces of a protection column 24 are projected on a surface of the film substrate 22 from a direction that is perpendicular to the surface of the film substrate 22 is area A which is the hatched region in FIG. 6. For instance, in case of the protection column 24 having a truncated cone shape, the projection area A of the lateral surfaces of the protection column 24 is given as $A=\pi(d2^2-d1^2)/4$ where d2 is a bottom surface diameter and d1 a diameter of the tip end surface 24*b*. Further, the divided area on the surface of the film substrate 22 with respect to the single protection column 24 is area Q which is the region surrounded by the broken line in FIG. 6. More particularly, the divided area Q of a single protection column 24 is given as Q=P1×P2 where P1, P2 are respective array pitches of two orthogonal directions of the protection column 24, and roughly speaking, corresponds to the planar area of the film substrate 22 divided by the number of protection columns 24. Accordingly, the lateral surface projection occupying area rate can be obtained by 100× (projection area A/divided area Q) [%]. The lateral surface projection occupying area rate varies depending on factors such as the inclination angle of the lateral surfaces, the height, the bottom surface area and the tip end surface area of the protection column and the density or the array pitch of the protection columns.

Figure 7:
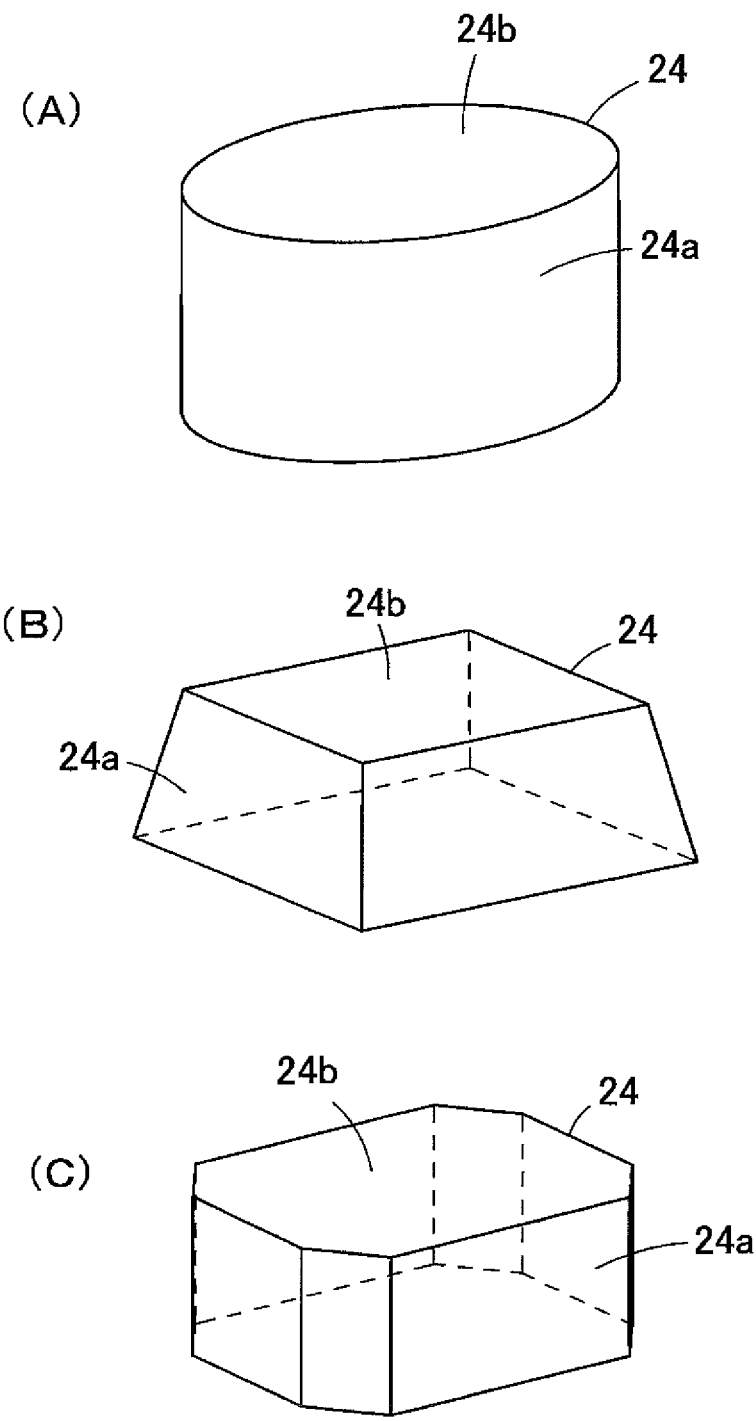

In this respect, the protection columns 24 are not limited to those of truncated cone shape. For instance, FIG. 7(A) shows a protection column 24 of elliptical frustum shape which horizontal section is of elliptic shape. FIG. 7(B) shows a protection column 24 of truncated pyramid shape (square pyramid shape) having a rectangular bottom surface. FIG. 7(C) shows a protection column 24 of truncated pyramid shape (octagonal truncated pyramid shape) having an octagonal bottom surface. These protection columns 24 also have a lateral surface projection occupying area rate of not less than 0.01% and not more than 0.25%. It is also desirable to set the inclination angle α of their lateral surfaces 24*a* to be not less than 80 degrees and below 90 degrees (preferably not more than 88 degrees).

Figure 8:
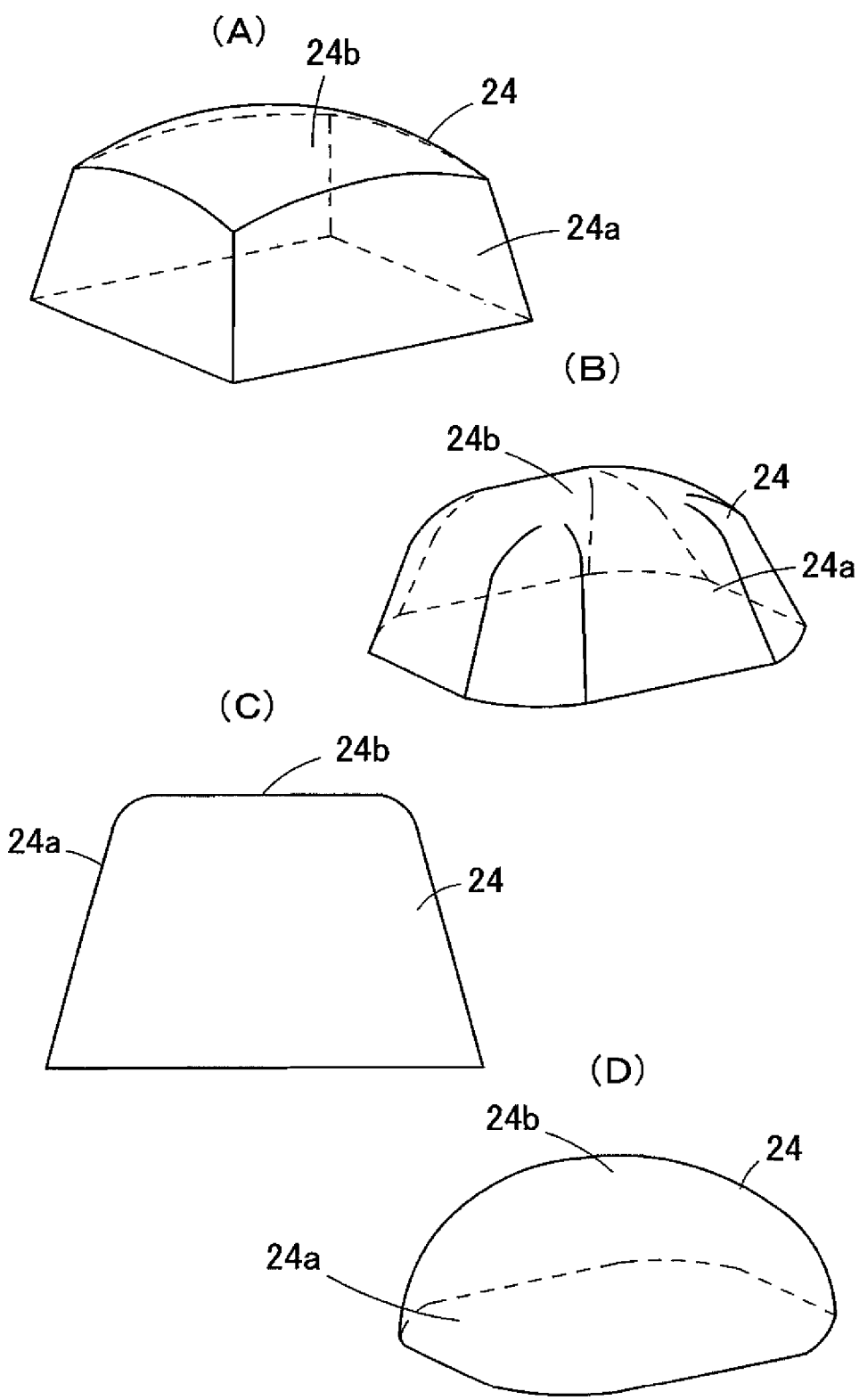
FIG. 8(A), FIG. 8(B) and FIG. 8(D) are perspective views showing further shapes of the protection column.
FIG. 8(C) is a sectional view of the protection column shown in FIG. 8(B).

It is not necessary that a section passing through a center of the protection column 24 is comprised by straight lines but it could also include curves. For instance, in the protection column 24 as shown in FIG. 8(A), the tip end surface 24*b* is comprised by curves. The protection columns 24 as shown in FIG. 8(B) and FIG. 8(C) are configured in that portions between the lateral surfaces 24*a* and the tip end surface 24*b* are warped so that the portions between the lateral surfaces 24*a* and the tip end surface 24*b* are smoothly connected by curved surfaces. In this respect, FIG. 8(C) shows a section of the protection column 24 of FIG. 8(B). The protection column 24 shown in FIG. 8(D) is comprised of curved surfaces except for the bottom surface.

Also when the section passing through the center of the protection column 24 includes curves, the above definition of the lateral surface projection occupying area rate can be applied as when boundaries between the lateral surfaces 24*a* and the tip end surface 24*b* are clear as it is the case with the protection column 24 of FIG. 8(A). More particularly, the surfaces that are lower than the upper angles are defined to be the lateral surfaces 24*a* while a portion inward of the upper angles is defined to be the tip end surface 24*b* for calculating the lateral surface projection occupying area rate. However, when the section that passes through the center of the protection column 24 includes curves, boundaries of the lateral surfaces 24*a* and the tip end surface 24*b* will not be distinct so that the above definition of the lateral surface projection occupying area rate cannot be applied as it is. For instance, since boundaries of the lateral surfaces 24*a* and the tip end surfaces 24*b* are not clear in the protection column 24 of FIG. 8(B) or in the protection column 24 of FIG. 8(D) it is impossible to obtain the lateral surface projection occupying area rate as it is. In such instances, the lateral surface projection occupying area rate shall be obtained in the following manner.

Figure 10:
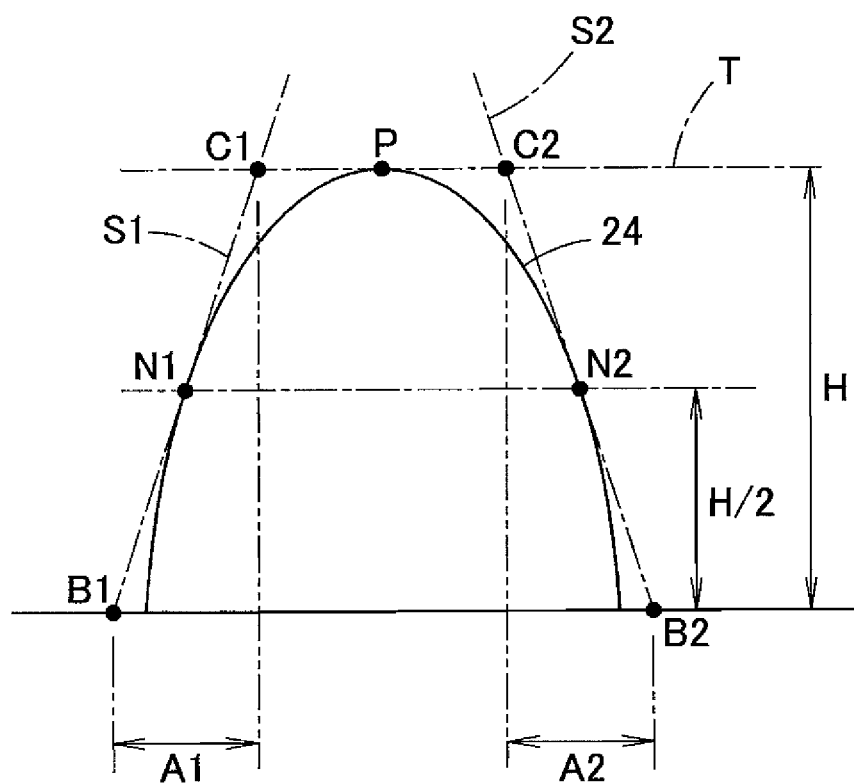
FIG. 10 is a view for explaining the method of obtaining a lateral surface projection occupying area rate of a protection column which section is comprised of curves and the way of obtaining an inclination angle of the lateral surfaces.

The method of obtaining the lateral surface projection occupying area rate when boundaries of the lateral surfaces and the tip end surface of a protection column is not clear will now be explained using FIG. 10. FIG. 10 shows a protection column 24 having elliptical cross-section as one example of such a protection column. First, when a height of an apex P measured from the bottom surface of the protection column 24 is defined as H, points N1, N2 on the surface of the protection column 24 located at heights that are ½ of the height H will be considered. More particularly, a height of a horizontal surface T that extends through the apex P and that is parallel to the bottom surface measured from the bottom surface is defined as H, and points on the surface of the protection column 24 at heights that are H/2 measured from the bottom surface will be defined as N1, N2. Next, tangents S1, S2 that contact the protection column surface at the points N1, N2 in a section passing through a central axis of the protection column 24 are obtained, and intersections of the tangents S1, S2 with the bottom surface are defined as B1, B2 while intersections of the tangents S1, S2 with the horizontal surface T are defined to be C1, C2. In this manner, a frustum shape that is defined by a trapezoid B1-N1-C1-P-C2-N2-B2 comprised of tangents S that are defined by the respective sections and the horizontal surface T will be the shape for calculating the lateral surface projection occupying area. In other words, for calculating the lateral surface projection occupying area of a protection column having such as shape, an area obtained by integrating line segments A1, A2 obtained by protecting tangents B1-C1 and B2-C2 on the bottom surface in a range of 180 degrees around the central axis of the protection column 24 shall be defined to be the projection area A of the lateral surfaces of the protection column.

Figure 9:
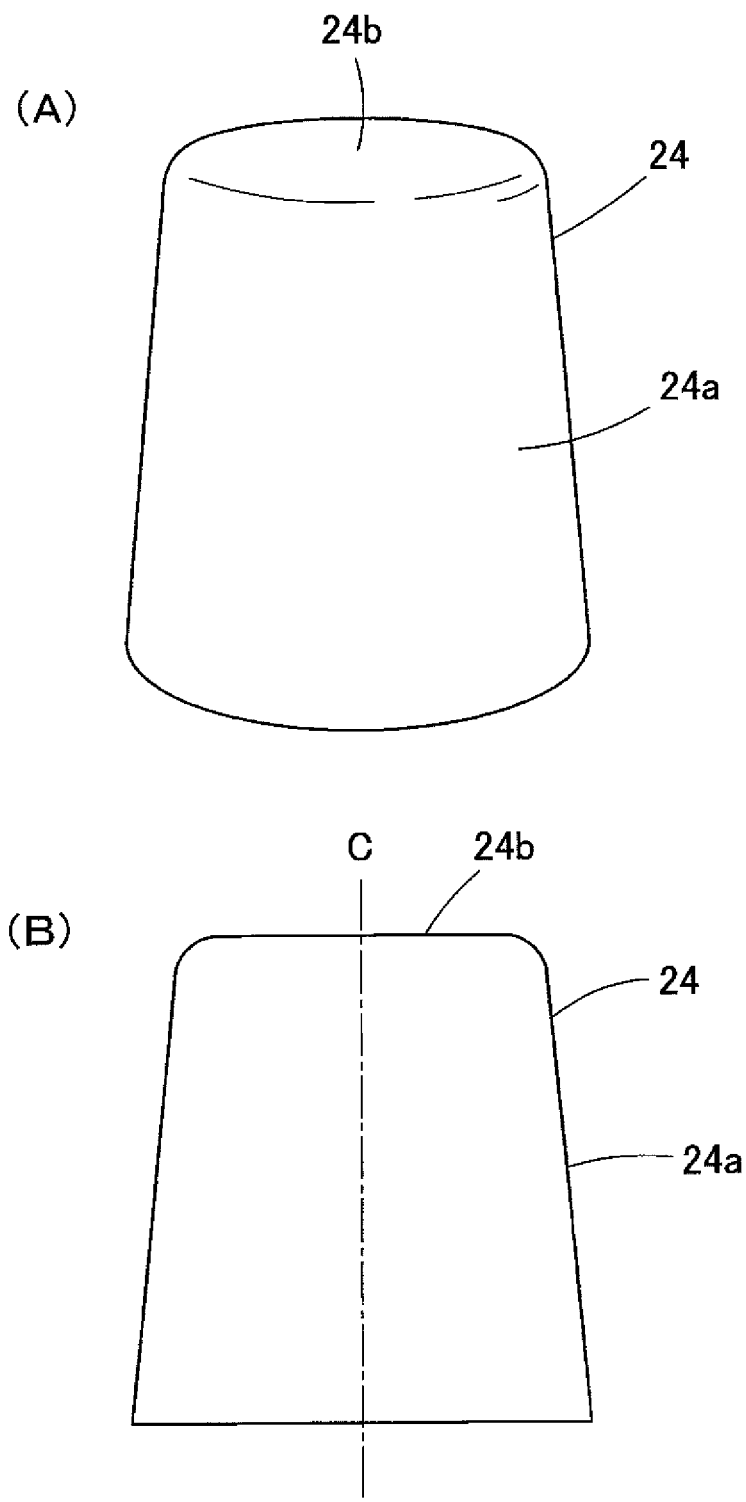
FIG. 9(A) is a perspective view showing still another shape of the protection column.
FIG. 9(B) is a sectional view of the protection column shown in FIG. 9(A).

For instance, in case of the protection column 24 of FIG. 8(B) or the protection column 24 of FIG. 8(D), it is possible to obtain the lateral surface projection occupying area rate of the respective protection columns 24 in the above-described manner. Further, considering a case in which the method of obtaining the lateral surface projection occupying area rate as in FIG. 10 is applied to a protection column 24 having a shape in which a central portion of the tip end surface 34*b* is flat, it can be understood that this method is highly appropriate. For instance, the protection column 24 as shown in FIG. 9(A) and FIG. 9(3) is of rotational symmetric shape in which the sectional shape as in FIG. 9(3) is rotated around the central axis C thereof. While the protection column 24 has a substantially truncated cone shape, its tip end surface 24*b* is a flat surface except for its outer peripheral portion and the boundaries of the lateral surfaces 24*a* and the tip end surface 24*b* are rounded. Applying the method of calculating the lateral surface projection occupying area of FIG. 10 to the protection column 24 having a shape as that of FIG. 9(A) and FIG. 9(B) means that the lateral surfaces 24*a* are extended upward while the tip end surface 24*b* is expanded outward so that the lateral surface projection occupying area rate is calculated of a truncated cone shape upon assuming a truncated cone shape with corners being complicated between lateral surfaces 24*a* and the tip end surface 24*b*. When protection columns of truncated cone shape are manufactured, border portions between the lateral surfaces and tip end surfaces will be rounded due to manufacturing reasons so that shapes as shown in FIG. 9(A) and FIG. 9(B) are obtained. In such instances, the lateral surface projection occupying area rate can be obtained by the method as in FIG. 10, and when the lateral surface projection occupying area rate is not more than 0.25%, it is within the scope of the present invention.

Also when the lateral surfaces 24a of the protection column 24 are warped, it is preferable to set the inclination angle of the lateral surfaces of the protection column 24 to be not less than 80 degrees and below 90 degrees (preferably not more than 88 degrees). When the surfaces (lateral surfaces) of the protection column 24 are warped, the inclination angles of the tangent S1 or S2 at point N1, N2 defined as in FIG. 10 shall be defined to be the inclination angle of the lateral surfaces 24a of the protection column 24.

(Comparison of Antireflection Films)

Next, merits of the antireflection film 21 according to the present invention will be explained while comparing the same with a conventional antireflection film 14.

Figure 11:
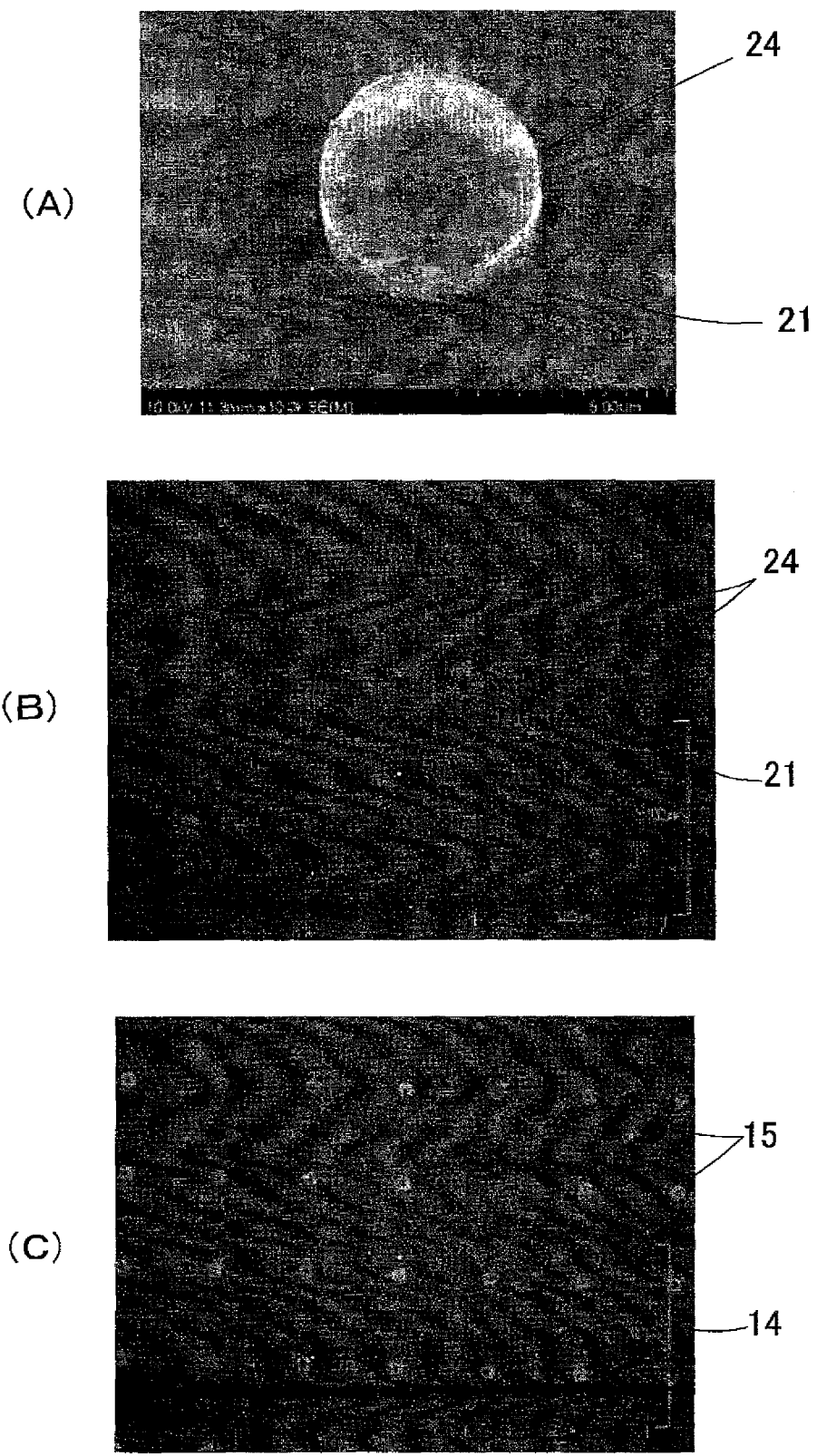
FIG. 11(A) is a SEM photo showing a protection column provided on an antireflection film according to one embodiment of the present invention seen from a diagonal direction.
FIG. 11(B) is a photomicrograph of the rear surface side of the antireflection film according to an embodiment of the present invention showing a situation with light entering the antireflection film through rear surface incidence.
FIG. 11(C) is a photomicrograph of the rear surface side of an antireflection film of the prior art showing a situation with light entering the antireflection film through rear surface incidence.

FIG. 11(B) is a photomicrograph showing a situation with light entering the antireflection film 21 according to the embodiment of the present invention through rear surface incidence. The antireflection film 21 according this embodiment is arranged in that substantially cylindrical protection columns 24 as shown in the SEM photo of FIG. 11(A) are provided at constant pitches as shown in FIG. 5(A). More particularly, a measurement sample of the present embodiment is obtained by forming protection columns 24 using transparent resin having a refractive index of 1.54 on a surface of a PET film substrate 22 having a refractive index of 1.56. The protection columns 24 have a bottom surface diameter d2 of 5.8 μm, a height H of 2 μm, and an inclination angle of the lateral surfaces 24a at a section passing through the center of 88 degrees, and an array pitch of the protection columns 24 is 50 μm. In the present embodiment, the lateral surface projection occupying area rate is 0.05%.

Figure 2:
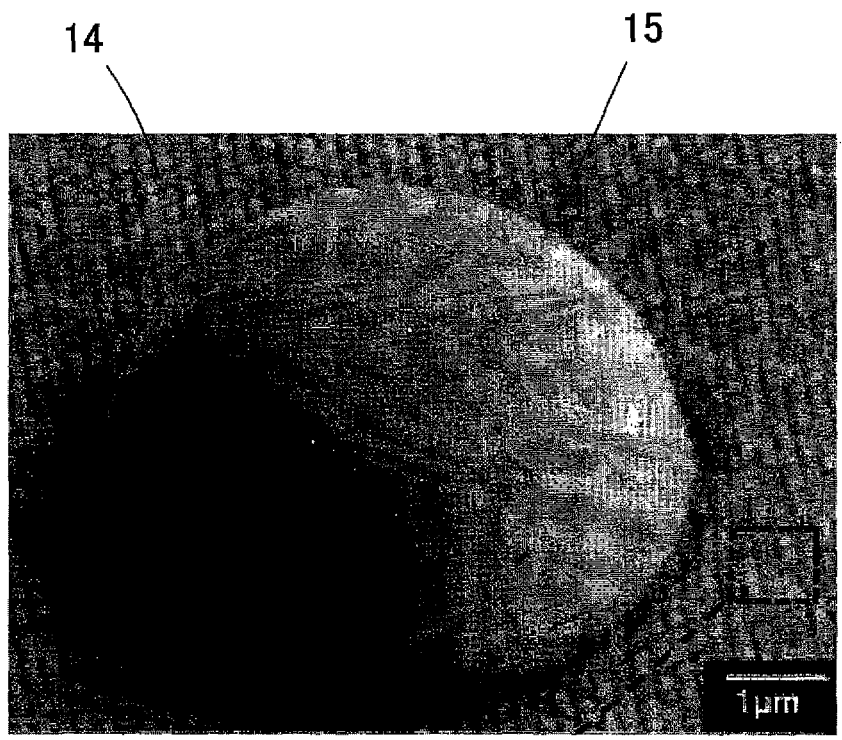
FIG. 2 is a SEM photo showing a conventional protection column having a truncated cone shape.
Figure 12:
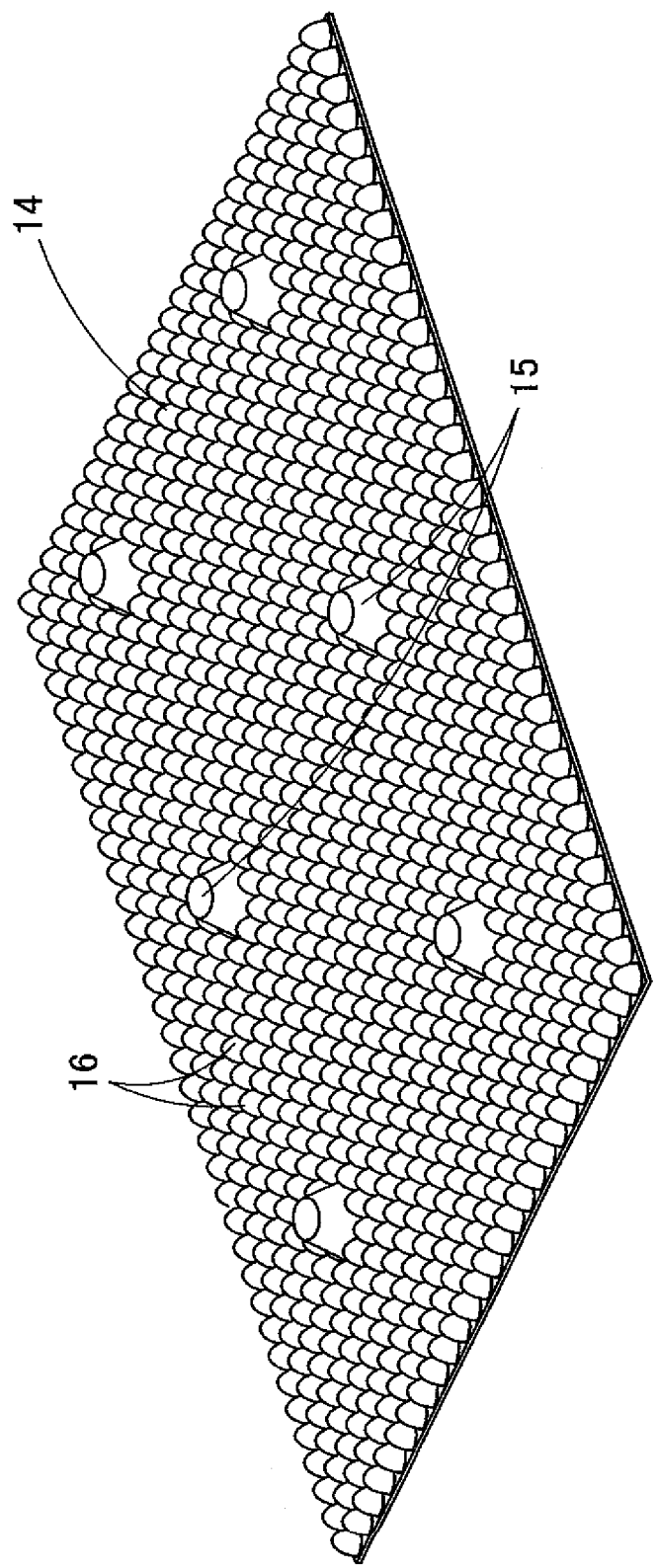
FIG. 12 is a perspective view showing a part of the antireflection film of the prior art in enlarged view.

FIG. 11(C) is a photomicrograph showing a situation with light entering the antireflection film 14 of the prior art through rear surface incidence. The antireflection film 14 of the prior art is arranged in that protection columns 15 of truncated cone shape as shown in the SEM photo of FIG. 2 are provided at a constant pitch as in FIG. 12. More particularly, a measurement sample of the prior art also is obtained by forming protection columns 15 using transparent resin having a refractive index of 1.54 on a surface of a PET film substrate having a refractive index of 1.56. The protection columns 15 have a bottom surface diameter of 5.4 μm, a height H of 2.3 μm and an inclination angle of the lateral surfaces 24a at a section passing through the center of 71 degrees, and an array pitch of the protection columns 24 is 50 μm. In the comparison example, the lateral surface projection occupying area rate will be 0.49%. In this respect, the photomicrograph of FIG. 11(C) is the same as FIG. 3(D) while its magnification is made to be identical to that of FIG. 11(B).

As it can be understood by comparing FIG. 11(B) and FIG. 11(C), according to the embodiment of the present invention, reflection caused by the protection columns in case of rear surface incidence is smaller than that of the prior art and hardly no reflected light will be present. Therefore, according to the embodiment of the present invention, it is possible to make the reflectance of light in case of rear surface incidence smaller when compared to an antireflection film of the prior art and to make the difference in reflectance in case of front surface incidence and in case of rear surface incidence small.

Figure 3:
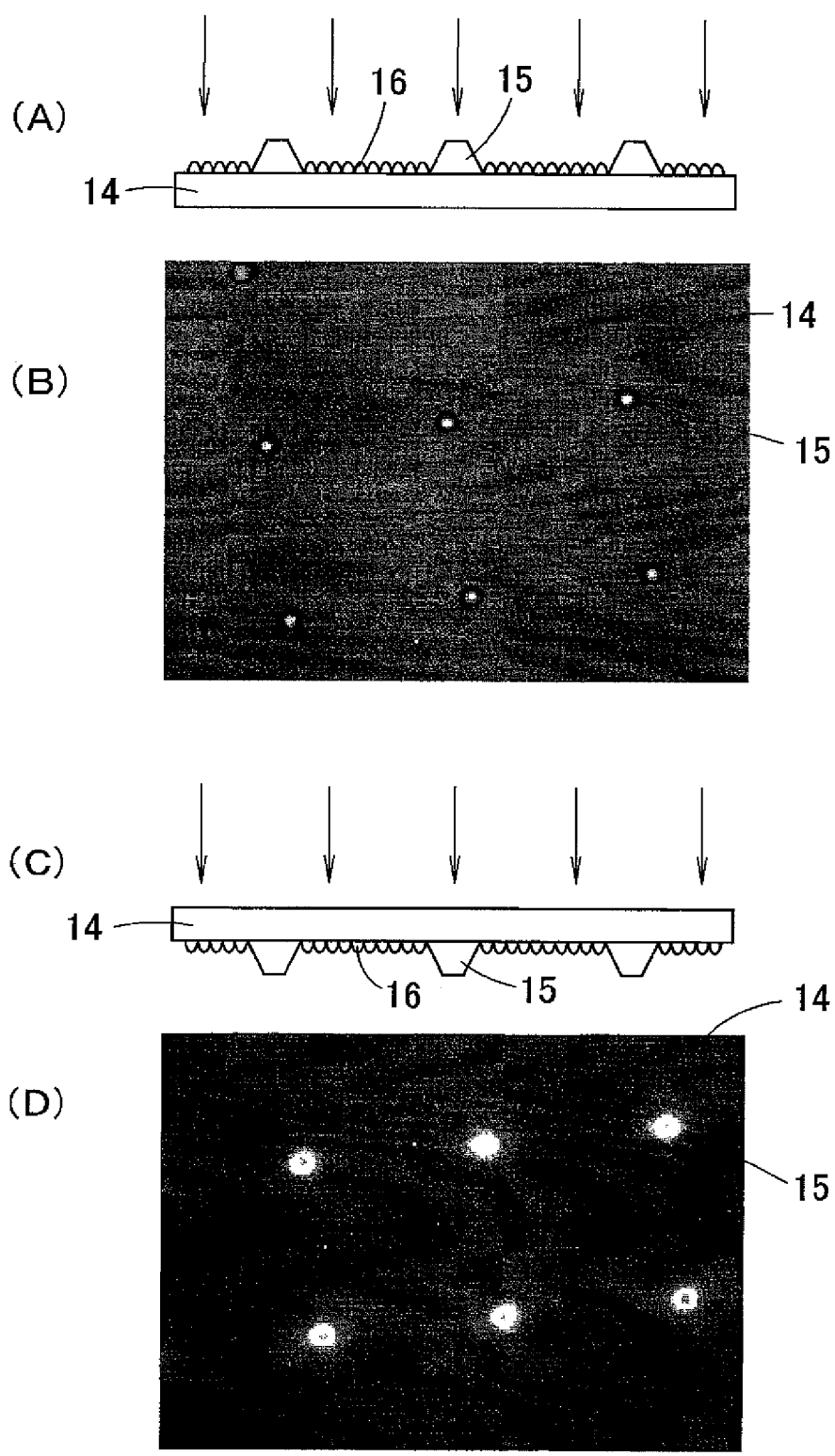
FIG. 3(A) is a view showing light that enters the antireflection film through front surface incidence.
FIG. 3(B) is a photomicrograph showing a situation of the front surface side of the antireflection film with light entering through front surface incidence.
FIG. 3(C) is a view showing light that enters the antireflection film through rear surface incidence.
FIG. 3(D) is a photomicrograph showing a situation of the rear surface side of the antireflection film with light entering through rear surface incidence.
Figure 4:
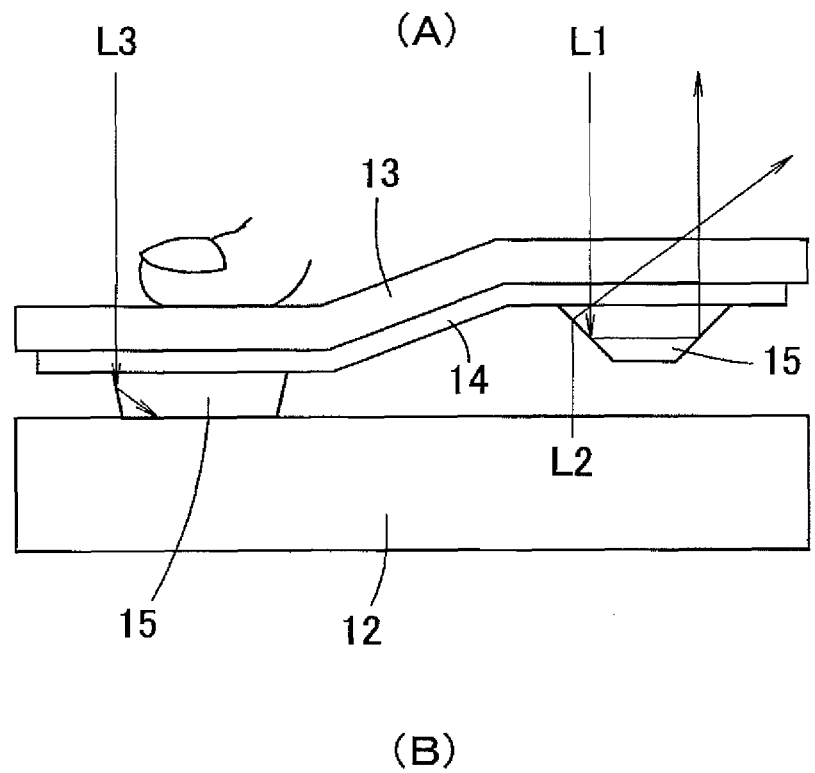
FIG. 4(A) is a view showing a behavior of light on a conventional antireflection film.
FIG. 4(B) is a photo showing a situation in which a sample obtained by affixing the antireflection film on a cover panel is pressed with two fingers.

In the antireflection film 14 of the prior art, when light enters through rear surface incidence as shown in FIG. 3(C), the reflectance will be larger when compared to a case of front surface incidence, and optical properties are remarkably degraded. Therefore, in case of the antireflection film 14 of the prior art, the image quality is degraded in case the film is affixed to the rear surface of the cover panel when compared to a case in which the antireflection film 14 is affixed to the front surface of the liquid crystal display panel. In contrast thereto, in case of the antireflection film 21 according to the embodiment of the present invention, differences in optical properties such as reflectance become smaller when comparing cases in which the film is affixed to the rear surface of the cover panel (in case of rear surface incidence) and in which the film is affixed to the front surface of the image display panel.

Next, respective values of transmittance, reflectance and haze values were measured in case light enters through rear surface incidence and through front surface incidence onto antireflection films using the above sample of the present embodiment of the invention and the sample of the prior art having the above-described arrangements. The following Table 1 shows the measurement results thereof. It should be noted that for this measurement, antireflection films provided only with the protection columns but not with the optical protrusions were employed in both of the present embodiment and the prior art. Moreover, in case of measurement using rear surface incidence, measurement was performed upon opposing a front surface side glass plate having a refractive index of 1.519 and a rear surface side glass plate having a refractive index of 1.519 in front and rear, and by employing an adhesive layer having a refractive index of 1.46 for adhering the antireflection film on the rear surface of the front surface side glass plate. In case of measurement using front surface incidence, measurement was performed upon opposing a front surface side glass plate having a refractive index of 1.519 and a rear surface side glass plate having a refractive index of 1.519 in front and rear, and by employing an adhesive layer having a refractive index of 1.46 for adhering the antireflection film on the front surface of the rear surface side glass plate.

TABLE 1

| | | Transmittance | Difference in transmittance on the front and rear | Reflectance | Difference in reflectance on the front and rear | Haze value | Difference in haze values on the front and rear |
|---|---|---|---|---|---|---|---|
| Embodiment | Rear surface incidence | 90.7% | −0.1% | 9.12% | 0.07% | 1.0% | 0.0% |
| | Front surface incidence | 90.8% | | 9.05% | | 1.0% | |
| Prior art | Rear surface incidence | 90.6% | −0.3% | 9.54% | 0.49% | 1.8% | 0.6% |
| | Front | 90.9% | | 9.05% | | 1.2% | |

TABLE 1-continued

|  | Transmittance | Difference in transmittance on the front and rear | Reflectance | Difference in reflectance on the front and rear | Haze value | Difference in haze values on the front and rear |
|---|---|---|---|---|---|---|
| surface incidence | | | | | | |

As it can be understood from Table 1, while the difference in transmittance in case of rear surface incidence and front surface incidence is −0.3% in case of the antireflection film of the prior art, it is −0.1% in case of the antireflection film of the present embodiment of the invention so that it is reduced to ⅓ in the present embodiment of the invention. Moreover, while the difference in reflectance in case of rear surface incidence and front surface incidence is 0.49% in case of the antireflection film of the prior art, it is 0.07% in case of the antireflection film of the present embodiment of the invention so that it is reduced to 1/7 in the present embodiment of the invention. Further, while the difference in haze values in case of rear surface incidence and front surface incidence is 0.6% in case of the antireflection film of the prior art, it is 0% in case of the antireflection film of the present embodiment of the invention so that it is extremely small in the present embodiment of the invention.

Therefore, according to the antireflection film of the present invention, it can be understood that it is possible to make differences in optical properties small in case of rear surface incidence and front surface incidence in the antireflection film provided with protection columns. Therefore, it is possible to achieve similar optical properties in case the antireflection film is affixed, for instance, to the rear surface of the cover panel of the display device or to the front surface of the image display panel so that its usability becomes favorable.

(Relationship Between Lateral Surface Projection Occupying Area Rate and Degree of Worsening of Reflectance or Black Stains)

Next, the relationship between the lateral surface projection occupying area rate of the protection columns and the degree of worsening of reflectance in case of rear surface incidence and the relationship between the lateral surface projection occupying area rate and whether black stains occur at spots of the protection columns were studied. The following Table 2 shows results thereof.

TABLE 2

| Lateral surface projection occupying area rate | Degree of worsening of reflectance | Black stains |
|---|---|---|
| 0.10% | 0.10% | ○ |
| 0.12% | 0.12% | ○ |
| 0.14% | 0.14% | ○ |
| 0.16% | 0.16% | ○ |
| 0.18% | 0.18% | ○ |
| 0.20% | 0.20% | ○ |
| 0.22% | 0.22% | ○ |
| 0.24% | 0.24% | ○ |
| 0.25% | 0.25% | ○ |
| 0.26% | 0.26% | X |
| 0.28% | 0.28% | X |
| 0.30% | 0.30% | X |

The definition of the lateral surface projection occupying area rate is as already explained (see FIG. 6). The degree of worsening of reflectance is an index representing the magnitude of reflectance in case light is rear surface reflected, wherein the degree of worsening of reflectance is defined as Degree of worsening of reflectance=100×(R2−R1)/R1 [%] wherein R2 is the reflectance of the antireflection film provided with protection columns in case of rear surface reflection and R1 is the reflectance of the antireflection film having no protection columns in case of rear surface reflection. The presence/absence of black stains was judged through visual confirmation wherein ○ indicates a case in which no black stains are generated when by pressed with a finger and X indicates a case in which black stains are generated when by pressed with a finger.

Measurements of Table 2 were conducted using a sample in which protection columns are formed of transparent resin having a refractive index of 1.54 on a surface of a PET film substrate having a refractive index of 1.56. The protection column had a bottom surface diameter of 5 μm and a height of 2 μm, and the array pitch of the protection columns 24 was 50 μm. In such a sample, lateral surface projection occupying area rates were varied in a range of 0.10% to 0.30% by differing inclination angles of the lateral surfaces in a section passing through the center of the protection columns so as to measure the degree of worsening of reflectance and to evaluate the presence/absence of black stains.

According to Table 2, no black stains can be seen when the lateral surface projection occupying area rate is not more than 0.25%. The reason why no black stains can be seen when the lateral surface projection occupying area rate is not more than 0.25% is that the difference in reflectance between spots at which protection columns are pressed with a finger and spots at which they are not pressed becomes small due to the fact that the reflectance at the time of rear surface incidence becomes small so that the black stains will not stand out. Further, as it will be discussed later, since the degree of worsening of reflectance of an antireflection film including protection columns with an inclination angle of the lateral surfaces of 70 degrees is 0.41%, the degree of worsening of reflectance is substantially half of that of the prior art when the lateral surface projection occupying area rate is not more than 0.25%. Therefore, in the antireflection film according to the present invention, it is desirable that the lateral surface projection occupying area rate of the protection columns is not more than 0.25%.

On the other hand, when the lateral surface projection occupying area rate comes close to 0%, the protection columns will be close to a columnar shape with lateral surfaces having an inclination angle of 0 degree so that the mold releasability of the protection columns at the time of molding will be worsened. It is accordingly desirable that the lateral surface projection occupying area rate is not less than 0.01%. Further, when the pitch of the protection columns becomes large, the optical protrusions which are located intermediate of protection columns abut the opposing surface so that they are easily crushed. For instance, in case of columnar protection columns having a bottom surface diameter of 5 μm, a height of 2 μm and with an inclination angle of the lateral surfaces of 88 degrees, when the array pitch of the protection columns becomes 100 μm, there will be a danger that the optical protrusions which are located intermediate of protection columns abut the opposing surface and are crushed. Since the value of the lateral surface projection occupying area rate at this time is approximately 0.01%, it is desirable that the lateral surface projection occupying area rate is not less than 0.01% also from this point of view.

(Relationship Between Lateral Surface Inclination Angle of Protection Columns and Degree of Worsening of Reflectance)

The relationship between the inclination angle of the lateral surfaces of the protection column and the degree of worsening of reflectance in case of rear surface incidence were studied. The following Table 3 shows results thereof.

TABLE 3

| Taper angle | Degree of worsening of reflectance |
|---|---|
| 70 degrees | 0.41% |
| 72 degrees | 0.37% |
| 74 degrees | 0.33% |
| 76 degrees | 0.29% |
| 78 degrees | 0.26% |
| 80 degrees | 0.21% |
| 82 degrees | 0.17% |
| 84 degrees | 0.13% |
| 86 degrees | 0.09% |
| 88 degrees | 0.05% |
| 90 degrees | 0.00% |

Measurements of Table 3 were conducted using a sample similar to that used for measurements of Table 2, wherein inclination angles of the lateral surfaces were varied in the range of 70 degrees to 90 degrees in units of 2 degrees for measuring the degree of worsening of reflectance.

Since the inclination angle of the lateral surfaces of the protection columns is 70 degrees in the antireflection film of the prior art, the degree of worsening of reflectance thereof is 0.41% as it can be seen in Table 3. Accordingly, when it is desired to set the degree of worsening of reflectance to be approximately half of the prior art value, the degree of worsening of reflectance shall be not more than 0.21% in Table 3. More particularly, when it is desired to set the degree of worsening of reflectance to be half of the prior art, it can be understood from Table 3 that the inclination angle of the lateral surfaces of the protection columns shall be not less than 80 degrees. On the other hand, when the inclination angle of the lateral surfaces comes close to 90 degrees, the mold releasability of the protection columns at the time of molding will be worsened so that it is desirable that the inclination angle of the lateral surfaces of the protection columns is not more than 88 degrees.

(Relationship Between Column Density and Reflectance)

Figure 13:
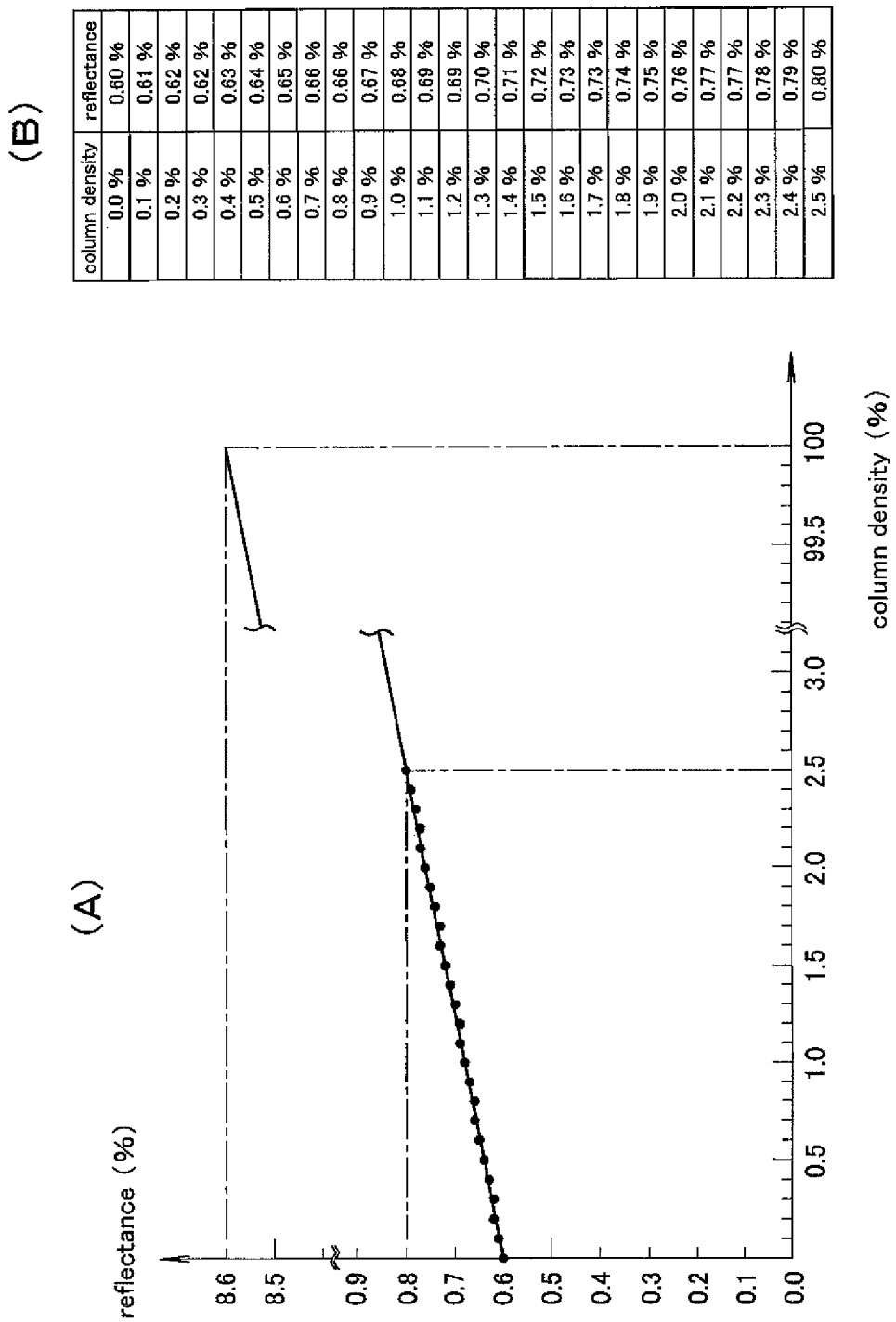
FIG. 13(B) is a table showing the relationship between column density of the protection columns and reflectance in case of rear surface reflection.
FIG. 13(A) is a graph for illustrating the relationship shown in FIG. 13(B).

Further, the relationship between column density of the protection columns and the reflectance in case of rear surface reflection was studied. The results are shown in FIG. 13(B). Note that FIG. 13(A) expresses FIG. 13(B) in form of a graph, further extrapolated with measurement data of column densities up to 100%. Here, the column density is an area density of the protection columns which expresses a ratio of a bottom area of a protection column to a divided area of the surface of the film substrate with respect to a single protection column in percentages. Explaining this with reference to FIG. 6, incase of a truncated cone shaped protection column, the bottom area B of the protection column 24 is expressed by $B=\pi(d2^2)/4$ where d2 is the bottom surface diameter. A divided area of the surface of the film substrate 22 with respect to a single protection column 24 is an area Q of a region that is surrounded by the broken line in FIG. 6, and a divided area Q per each protection column 24 is expressed by $Q=P1\times P2$ where P1, P2 are array pitches of the protection columns. Accordingly, the column density is obtained by 100×(bottom area B/divided area Q) [%].

The reflectance of conventional products is approximately 0.8% so that a reflectance of not more than 0.80% at the time of rear surface reflection would practically do, and according to FIG. 13(A), it can be understood that it would be sufficient when the column density is not more than 2.5%. Further, when the column density becomes larger than 2.5%, black stains due to protection columns tend to be connected so that there is the fear that linear black stains are generated when two spots are pressed with a finger.

(First Embodiment of the Display Device)

Figure 14:
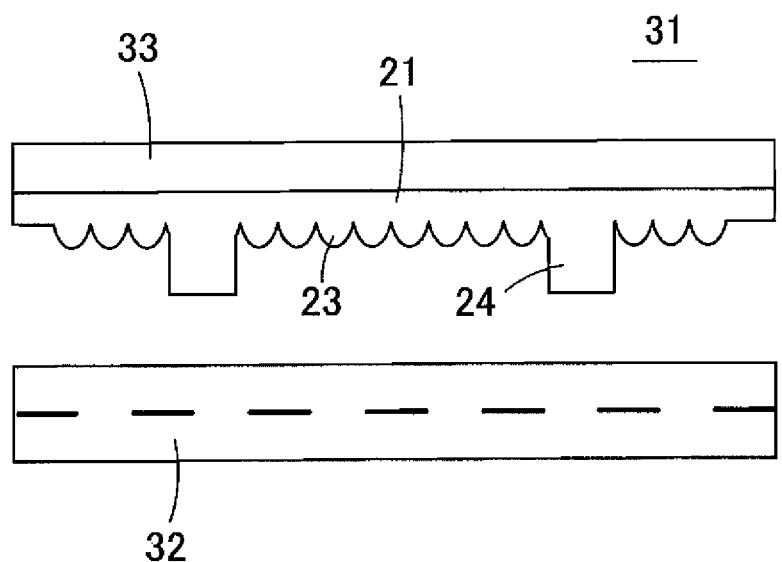
FIG. 14(A) is a schematic sectional view showing a display device according to a first embodiment in which the antireflection film according to the present invention is affixed to a rear surface of a cover panel.
FIG. 14(B) is a schematic sectional view showing the display device according to the first embodiment in which the antireflection film according to the present invention is affixed to a front surface of an image display panel.
Figure 14:
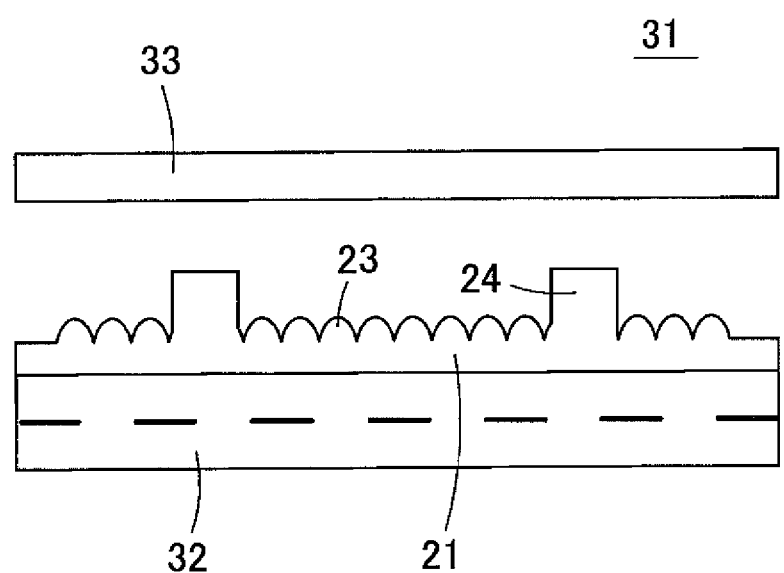

FIG. 14(A) and FIG. 14(B) show a first embodiment of the display device affixed with the antireflection film 21 according to the present invention. The display device 31 as shown in FIG. 14(A) is obtained by overlapping a cover panel 33 to a front surface of an image display panel 32 such as a liquid crystal display panel (LCD) or organic EL (OLED) with an air gap (space) interposed between, and the antireflection film 21 is affixed onto a rear surface of the cover panel 33. The display device 31 as shown in FIG. 14(B) is affixed with the antireflection film 21 on the front surface of the image display panel 32. In this respect, the image display panel 32 might be either for monochrome display or for color display. The cover panel 33 is a protection sheet of uniform thickness made of transparent resin.

In the antireflection film 21 of the present invention, the difference in optical properties such as reflectance and haze value is small in case of rear surface incidence and front surface incidence. Accordingly, differences in optical properties of the antireflection film 21 are hardly caused in case the antireflection film 21 is used by affixing the same on the rear surface of the cover panel 33 as in FIG. 14(A) and in case it is used by affixing the same on the front surface of the image display panel 32 as in FIG. 14(B). It is accordingly not necessary to separately provide an antireflection film for affixing the same to the cover panel 33 and an antireflection film for affixing the same to the image display panel 32, and it is possible to reduce stock quantity. Further, regardless of whether designing a display device 31 in which the antireflection film is affixed to the cover panel 33 or designing a display device 31 in which the antireflection film is affixed to the image display panel 32, designing can be performed by supposing a single type of antireflection film 21 so that designing of the display device becomes easy. For instance, it is possible to affix the antireflection film 21 that had been affixed to the front surface of the image display panel 32 so far to the rear surface of the cover panel 33 in accordance to its use or other factors.

Further, by using the antireflection film 21 of the present invention, even when the cover panel 33 is pressed, black stains are hardly generated at spots of the pressed protection columns 24 so as to improve screen qualities of the display device 31.

Modified Example of the First Embodiment

Figure 15:
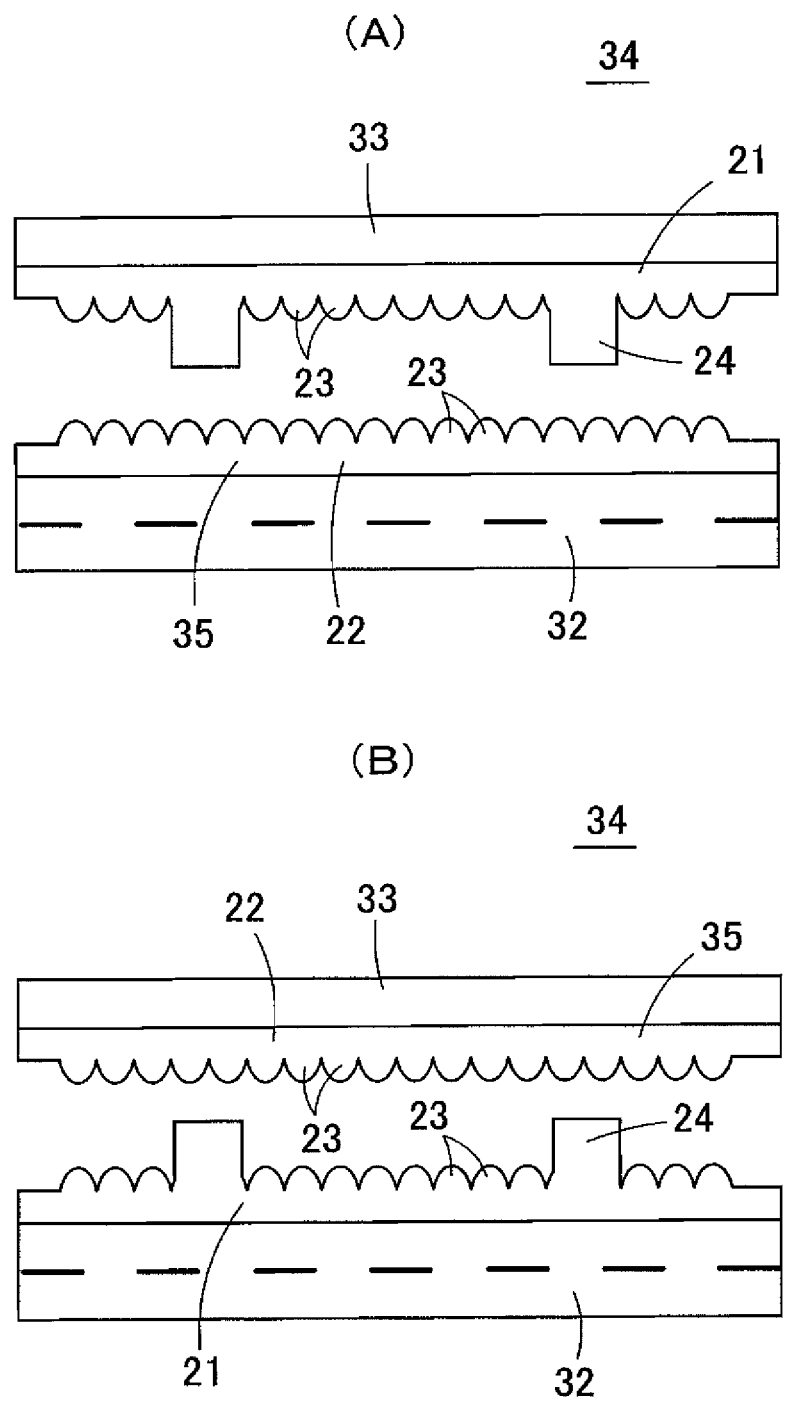
FIG. 15(A) and FIG. 15(B) are schematic sectional views showing a modified example of the display device according to the first embodiment.

The antireflection film 21 can be combined with an antireflection film 35 that includes no protection columns 24 but is formed with only optical protrusions 23 on the film substrate 22. For instance, as in the display device 34 as shown in FIG. 15(A), the antireflection film 35 with no protection columns 24 shall be affixed to the front surface of the image display panel 32 and the antireflection film 21 with the protection columns 24 shall be affixed to the rear surface of the cover panel 33. Alternatively, it is possible to affix the antireflection film 21 with the protection columns 24 to the front surface of the image display panel 32 and to affix the antireflection film 35 with no protection columns 24 to the rear surface of the cover panel 33 as in the display device 34 as shown in FIG. 15(B). In this manner, by using two antireflection films 21, 35, it is possible to further reduce the reflectance of the display device.

Figure 16:
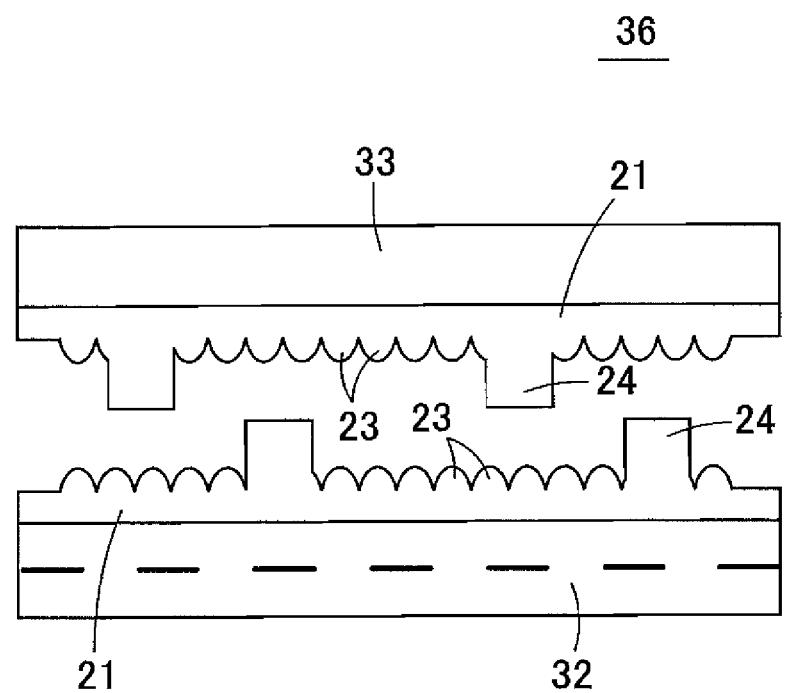
FIG. 16 is a schematic sectional view showing another modified example of the display device according to the first embodiment.

It is also possible to affix the antireflection film 21 with the protection columns 24 to both of the front surface of the image display panel 32 and the rear surface of the cover panel 33 as in the display device 36 as shown in FIG. 16.

(Second Embodiment of the Display Device)

Figure 17:
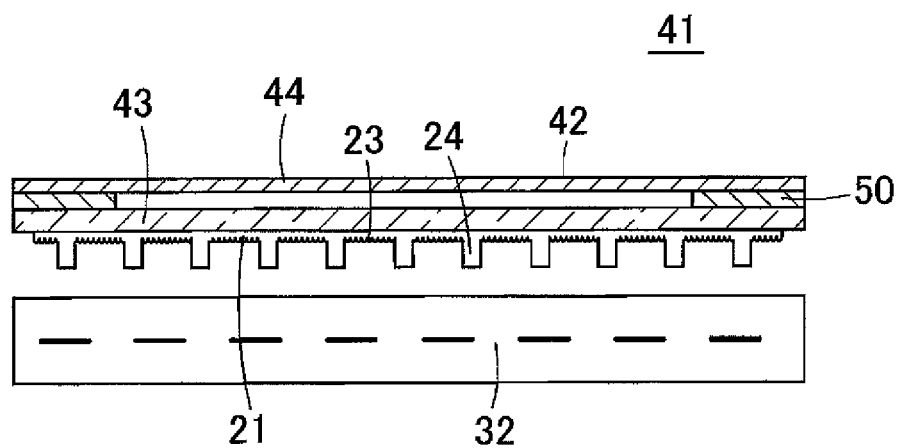
FIG. 17(A) is a schematic sectional view showing a display device according to a second embodiment.
FIG. 17(B) is a plan view of a touch panel substrate.
Figure 17:
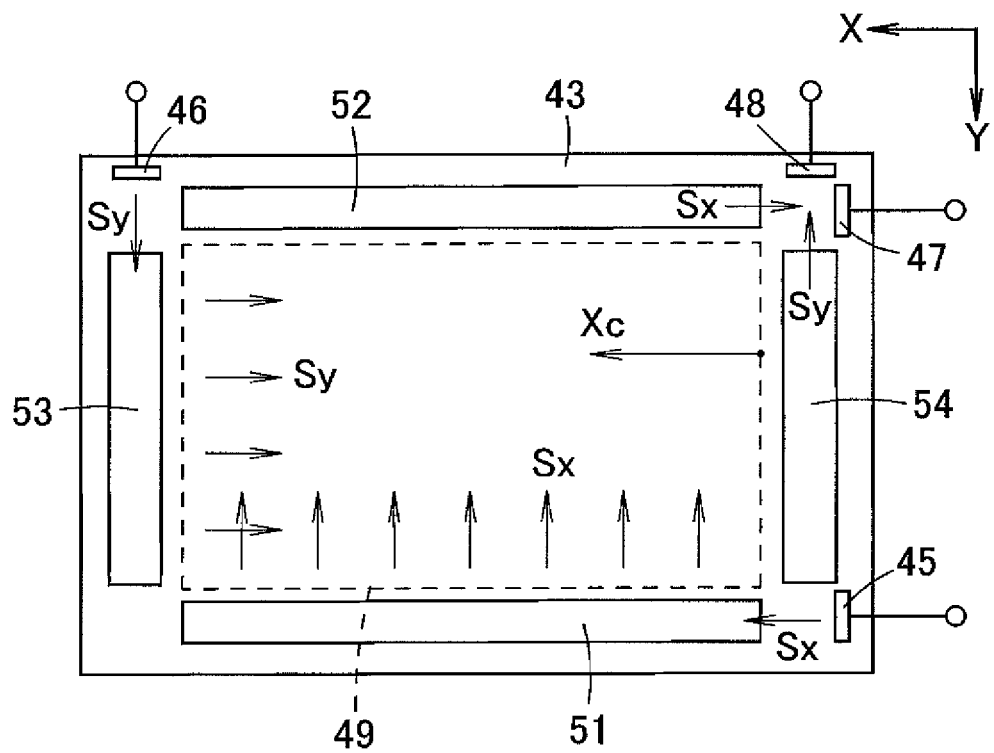

FIG. 17(A) shows a second embodiment of the display device affixed with the antireflection film 21 according to the present invention. This display device 41 is obtained by overlapping a touch panel 42 to a front surface of an image display panel 32 such as a liquid crystal display panel (LCD) or organic EL (OLED) with an air gap (space) interposed between, and the antireflection film 21 is affixed onto a rear surface of the touch panel 42.

As shown in FIG. 17(A), the touch panel 42 comprises a touch panel substrate 43 that propagates surface acoustic waves and a sheet material 44 that is disposed to oppose the touch panel substrate 43 and that can contact the touch panel substrate 43 by pressing. A peripheral edge portion of the touch panel substrate 43 and a rear surface peripheral edge portion of the sheet material 44 are joined by a spacer 50 of frame-like shape, and a closed space surrounded by the spacer is formed between a front surface of the touch panel substrate 43 and a rear surface of the sheet material 44.

The touch panel substrate 43 functions as a medium for propagating the surface acoustic waves and is made of a glass material. The touch panel substrate 43 has a low attenuation of surface acoustic waves because it is made of glass material and it can effectively propagate the surface acoustic waves. In contrast thereto, the sheet material 44 is made of a soft material with flexibility. Therefore, when the front surface of the sheet material 44 is pressed, the pressed portion will partially flex so that the corresponding portion contacts the touch panel substrate 43. Then, when the sheet material 44 contacts the touch panel substrate 43, it functions to absorb surface acoustic waves propagating the surface of the touch panel substrate 43 at this contact portion.

The touch panel substrate 43 and the sheet material 44 are substantially transparent (colorless and transparent, colored and transparent, semitransparent), and it is possible to recognize images displayed by the rearward image display panel 32 through the touch panel substrate 43 and the sheet material 44.

The touch panel substrate 43 has a structure as shown in FIG. 17(B). An X transmission element 45 and a Y transmission element 46, an X reception element 47 and a Y reception element 48, and reflection arrays 51 to 54 are provided at the peripheral edge portions of the touch panel substrate 43. Regions of the touch panel substrate 43 other than the peripheral edge portions are an input detection region 49 which the rear surface of the sheet material 44 contacts when the sheet material 44 is pressed with a finger or a pen for touch input.

At the peripheral edge portions of the touch panel substrate 43, an edge side that is parallel to an X-axial direction is provided with the reflection array 51 along the edge side thereof. The edge side that opposes the reflection array 51 of the touch panel substrate 43 is provided the reflection array 52 along the X-axial direction. Similarly, at the peripheral edge portions of the touch panel substrate 43, an edge side that is parallel to a Y-axial direction is provided with the reflection array 53 along the edge side thereof. The edge side that opposes the reflection array 53 of the touch panel substrate 43 is provided the reflection array 54 along the Y-axial direction.

At the peripheral edge portions of the touch panel substrate 43, the X transmission element 45 is provided to oppose one end portion of the reflection array 51 and the X reception element 47 is provided to oppose the end portion of the reflection array 52 on the same side at which the X transmission element 45 is disposed. Similarly, at the peripheral edge portions of the touch panel substrate 43, the Y transmission element 46 is provided to oppose one end portion of the reflection array 53 and the Y reception element 48 is provided to oppose the end portion of the reflection array 54 on the same side at which the Y transmission element 46 is disposed.

The reflection array 51 functions to reflect the surface acoustic waves that have propagated in the X direction and to convert the propagation direction of the surface acoustic waves in the −Y direction over its entire length. The reflection array 52 functions to reflect the surface acoustic waves that have propagated in the −Y direction and to convert the propagation direction of the surface acoustic waves in the −X direction over its entire length. Moreover, the reflection array 53 functions to reflect the surface acoustic waves that have propagated in the Y direction and to convert the propagation direction of the surface acoustic waves in the −X direction over its entire length. The reflection array 54 functions to reflect the surface acoustic waves that have propagated in the −X direction and to convert the propagation direction of the surface acoustic waves in the −Y direction over its entire length.

The X transmission element 45 is an element for generating surface acoustic waves on the surface of the cover panel 13 and for propagating the same in the X direction, and the Y transmission element 46 is an element for generating surface acoustic waves on the surface of the touch panel substrate 43 and for propagating the same in the Y direction. Further, the X reception element 47 is an element for receiving surface acoustic waves which propagate on the touch panel substrate 43 in the −X direction, and the Y reception element 48 is an element for receiving surface acoustic waves which propagate on the touch panel substrate 43 in the −Y direction.

Thus, the surface acoustic waves Sx that have been generated by the X transmission element 45 proceed in the X direction and enter the end portion of the reflection array 51. The surface acoustic waves Sx that have proceeded to the reflection array 51 are reflected little by little at respective portions of the reflection array 51 while they propagate through the reflection array 51 in the X direction. The surface acoustic waves Sx that have been reflected by the reflection array 51 exit from the reflection array 51 and enter the input detection region 49 and propagate the input detection region 49 in the −Y direction. In the input detection region 49, the surface acoustic waves Sx that have exited from the entire length of the reflection array 51 consequently propagate in the −Y direction with a time lag. When the surface acoustic waves Sx that have propagated through the input detection region 49 in the −Y direction reach the reflection array 52, the surface acoustic waves Sx are reflected by the reflection array 52 to propagate along the reflection array 52 in the −X direction. The surface acoustic waves Sx that have exited from the end portion of the reflection array 52 are received by the X reception element 47.

Similarly, the surface acoustic waves Sy that have been generated by the Y transmission element 46 proceed in the Y direction and enter the end portion of the reflection array 53. The surface acoustic waves Sy that have proceeded to the reflection array 53 are reflected little by little at respective portions of the reflection array 53 while they propagate through the reflection array 53 in the Y direction. The surface acoustic waves Sy that have been reflected by the reflection array 53 exit from the reflection array 53 and enter the input detection region 49 and propagate through the input detection region 49 in the −X direction. In the input detection region 49, the surface acoustic waves Sy that have exited from the entire length of the reflection array 53 consequently propagate in the −X direction with a time lag. When the surface acoustic waves Sy that have propagated through the input detection region 49 in the −X direction reach the reflection array 54, the surface acoustic waves Sy are reflected by the reflection array 54 to propagate along the reflection array 54 in the −Y direction. The surface acoustic waves Sy that have exited from the end portion of the reflection array 54 are received by the Y reception element 48.

Here, when considering a case in which a point on the surface of the touch panel 42 (sheet material 44) is pressed with a finger or a touch pen, the rear surface of the sheet material 44 contacts the touch panel substrate 43 (input detection region 49) at this point and the surface acoustic waves Sx and Sy that had been propagating through the point are absorbed by the sheet material 44 to become defect. The X reception element 47 can accordingly detect the X coordinate of the pressed point based on the time of the defect signal and the Y reception element 48 can detect the Y coordinate of the pressed point based on the time of the defect signal.

This detection method is based on the following principle. Supposing that surface acoustic waves Sx are generated at the X transmission element 45 at a certain time To, the distances until the waves reach the X reception element 47 will differ depending on the X coordinates while passing the input detection region 49 so that the time of reception by the X reception element 47 will differ as well. Supposing that the time at which the surface acoustic waves Sx passing the input detection region 49 through an edge that is closest to the X transmission element 45 and the X reception element 47 (edge extending in the Y direction) is received by the X reception element 47 is defined as Ta, the time at which the surface acoustic waves Sx pass a path that is remote from the edge that is closest to the X transmission element 45 and the X reception element 47 by distance Xc in the X-axial direction is received by the X reception element 47 is given by Ta+2 (Xc/v). Here, v is a propagation speed of the surface acoustic waves Sx. Accordingly, in the presence of a defect in a signal that is received by the X reception element 47 at time t, the X coordinate of the pressed point will be $$X = Xs = (t - Ta) \cdot v/2$$

The Y coordinate of the pressed point can be similarly obtained.

The X transmission element 45, the Y transmission element 46, the X reception element 47 and the Y reception element 48 of the touch panel 42 are electrically connected to a detection portion (detection circuit) (not shown) and Z coordinates and Y coordinates of pressed points are calculated in the detection portion for output.

Modified Example of the Second Embodiment

Figure 18:
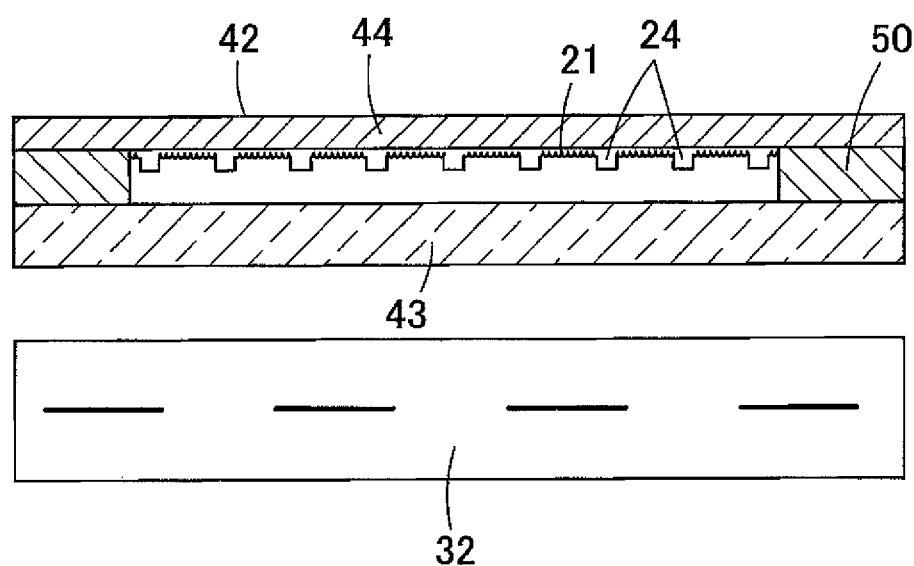
FIG. 18 is a schematic sectional view showing a modified example of the display device according to the second embodiment.

FIG. 18 is a schematic sectional view showing a modified example of the display device according to the second embodiment. In the display device 61 according to this modified example, the antireflection film 21 is affixed to the rear surface of the sheet material 44 of the touch panel 42. According to the modified example, the antireflection film 21 does not only exhibit the action and effects of the antireflection film according to the present invention but also prevents excess coherence of the touch panel substrate 43 and the sheet material 44 at the time of touch input by protection columns 24.

What is claimed is:

1. A coherence prevention film comprising a film substrate and a plurality of projections formed on a surface of the film substrate,
   wherein the projections are arranged in that their sectional areas of sections that are parallel to a surface of the film substrate become gradually smaller in approaching from a base end portion side towards a tip end portion side,
   wherein a lateral surface projection occupying area rate, which is a ratio of a projection area in which all of the lateral surfaces of a single projection are projected on a surface of the film substrate from a direction that is perpendicular to the surface of the film substrate to a divided area on the surface of the film substrate with respect to the single projection, is not more than 0.25%; and
   wherein a column density, which is a ratio of a base area of a single projection to a divided area on the surface of the film substrate with respect to the single projection, is not more than 2.5%.

2. The coherence prevention film as claimed in claim 1, wherein the lateral surface projection occupying area rate is not less than 0.01%.

3. The coherence prevention film as claimed in claim 1, wherein the lateral surfaces of the projection have an inclination angle of at least a base end portion thereof of not less than 80 degrees and below 90 degrees.

4. The coherence prevention film as claimed in claim 1, wherein the inclination angle of at least the base end portion of the lateral surfaces is not more than 88 degrees.

5. The coherence prevention film as claimed in claim 1, wherein the projection has a frustum shape.

6. The coherence prevention film as claimed in claim 1, wherein an antireflection structure comprised of a plurality of minute optical protrusions is formed on the surface of the film substrate.

7. A touch panel affixed with the coherence prevention film as claimed in claim 1.

8. A touch panel affixed with the coherence prevention film as claimed in claim 6.

9. The touch panel as claimed in claim 8, wherein the cohesion prevention film is affixed to a rear surface thereof.

10. A display device cover panel affixed with the coherence prevention film as claimed in claim 1.

11. A display device cover panel affixed with the coherence prevention film as claimed in claim 6.

12. The display device cover panel as claimed in claim 11, wherein the cohesion prevention film is affixed to a rear surface thereof.

* * * * *